United States Patent [19]

Toda et al.

[11] Patent Number: 5,386,720
[45] Date of Patent: Feb. 7, 1995

[54] INTEGRATED SPM SENSOR

[75] Inventors: Takayama, Nagano, Katsuhiro Matsuyama, Tokyo, Nobuaki Sakai, Tokyo, Yasushi Nakamura, Yamanashi-Ken, all of Japan

[73] Assignee: Olympus Optical Co., Ltd., Tokyo, Japan

[21] Appl. No.: 197,352

[22] Filed: Feb. 16, 1994

Related U.S. Application Data

[63] Continuation-in-part of Ser. No. 998,912, Dec. 30, 1992, abandoned.

[30] Foreign Application Priority Data

| Jan. 9, 1992 | [JP] | Japan | 4-002278 |
| May 8, 1992 | [JP] | Japan | 4-115899 |
| Sep. 25, 1992 | [JP] | Japan | 4-256855 |
| Mar. 23, 1993 | [JP] | Japan | 5-063547 |

[51] Int. Cl.$^6$ .......................... H01J 37/26; G01B 5/28
[52] U.S. Cl. ...................................... 73/105; 250/306; 250/307
[58] Field of Search .................. 73/105; 250/306, 307, 250/423 F

[56] References Cited

U.S. PATENT DOCUMENTS

| 4,724,318 | 2/1988 | Binnig | 250/306 |
| 4,823,004 | 4/1989 | Kaiser et al. | 250/306 |
| 4,966,037 | 10/1990 | Sumner et al. | 73/204 |
| 5,021,364 | 6/1991 | Akamine et al. | 250/306 |
| 5,047,637 | 9/1991 | Toda | 73/105 |
| 5,066,358 | 11/1991 | Quate et al. | 250/306 |
| 5,072,116 | 12/1991 | Kawade et al. | 73/105 |
| 5,075,548 | 12/1991 | Kajimura | 250/306 |
| 5,092,163 | 3/1992 | Young | 73/105 |
| 5,166,520 | 11/1992 | Prater et al. | 250/307 |

OTHER PUBLICATIONS

"Atomic force Microscopy Using A Piezoresistive Cantilever" by M. Tortonese et al; G.L. Report No. 4821; Transducers '91 (Mar. 1991).

Primary Examiner—Hezron E. Williams
Assistant Examiner—George M. Dombroske
Attorney, Agent, or Firm—Frishauf, Holtz, Goodman & Woodward

[57] ABSTRACT

An integrated AFM sensor includes a cantilever which has two beams extending from a support portion. The beams are integrated with each other at their ends to form a triangular free end, and a probe having a sharp distal end is arranged at the free end. The cantilever is formed by stacking a passivation layer, a piezoresistive layer, and a silicon layer. Electrodes electrically connected to the piezoresistive layer are formed at the fixed end of the cantilever through contact holes.

21 Claims, 25 Drawing Sheets

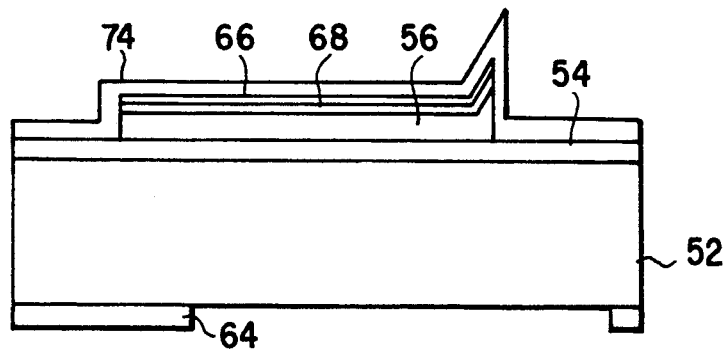
F I G. 3F
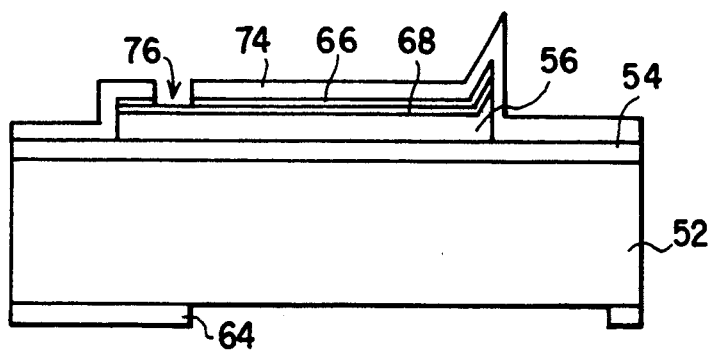
F I G. 3G
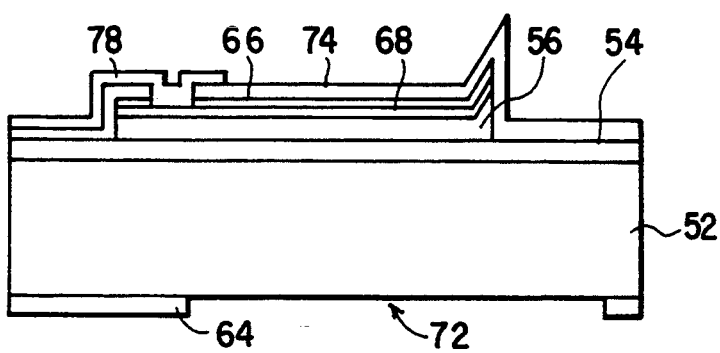
F I G. 3H
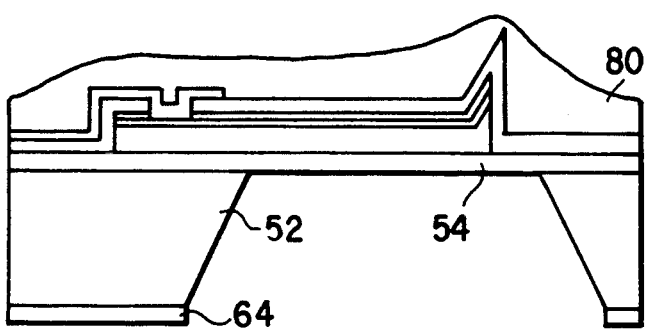
F I G. 3I

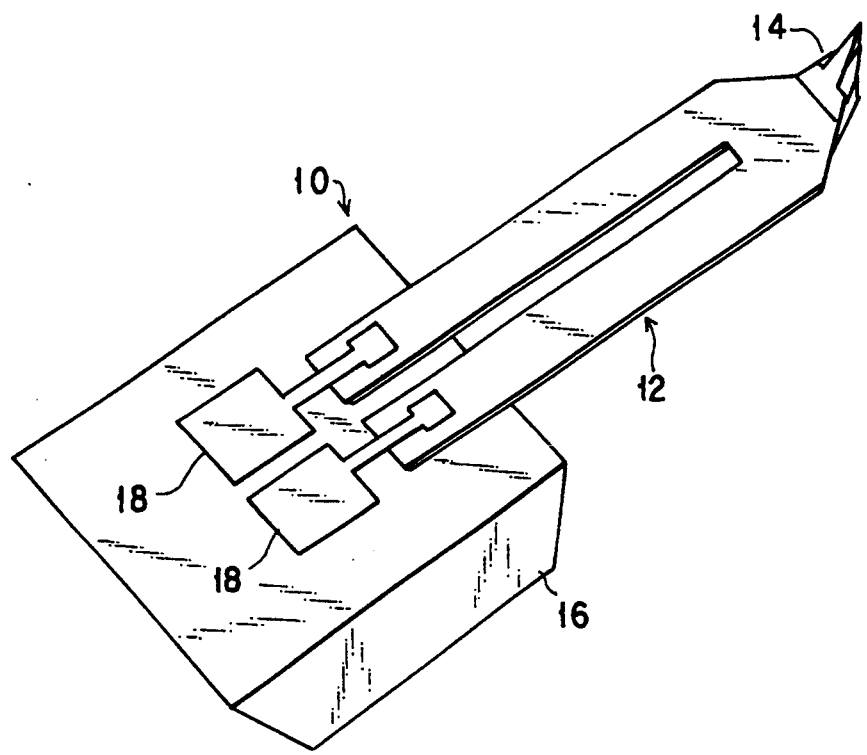
F I G. 4A
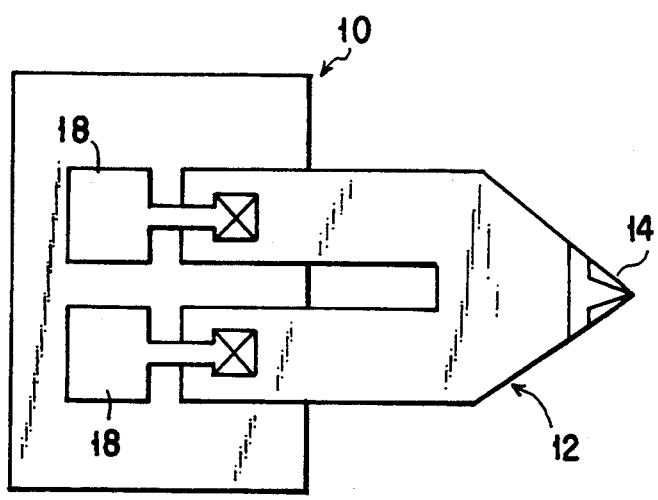
F I G. 4B

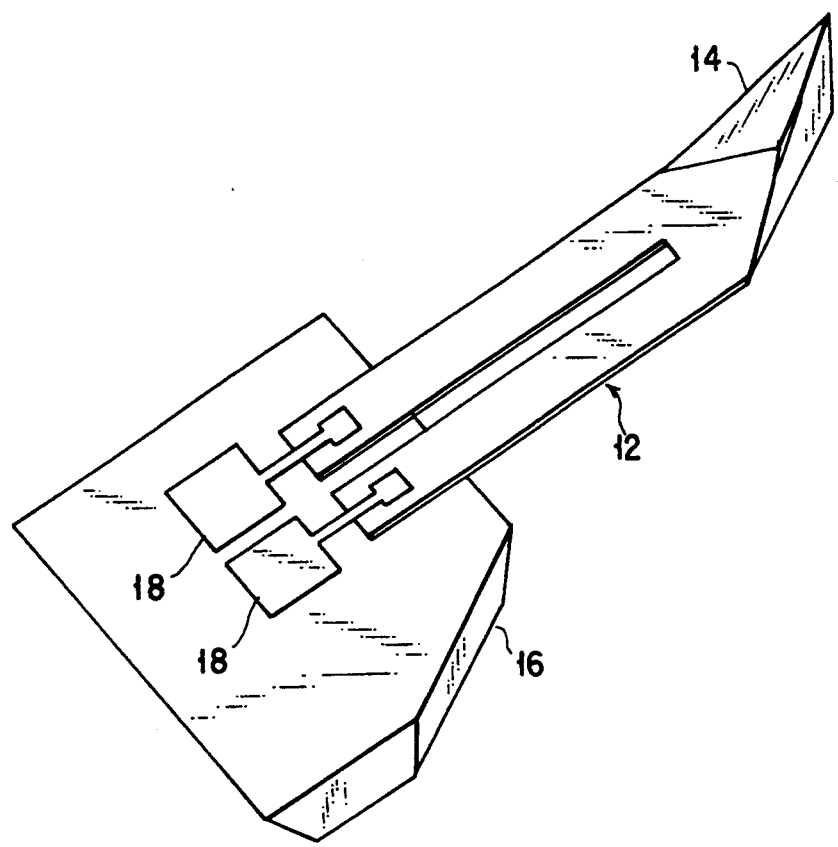
F I G. 5A
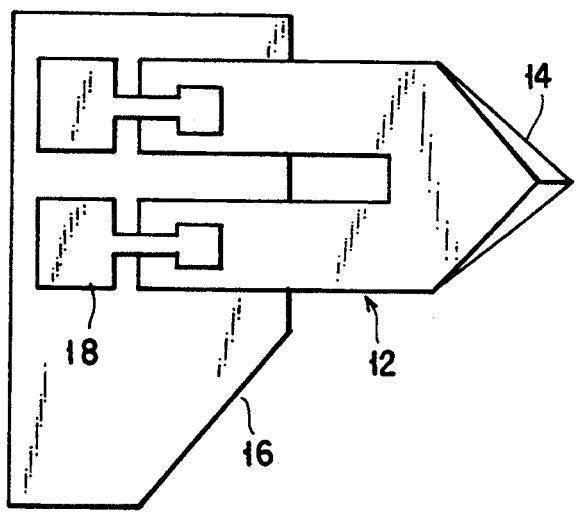
F I G. 5B

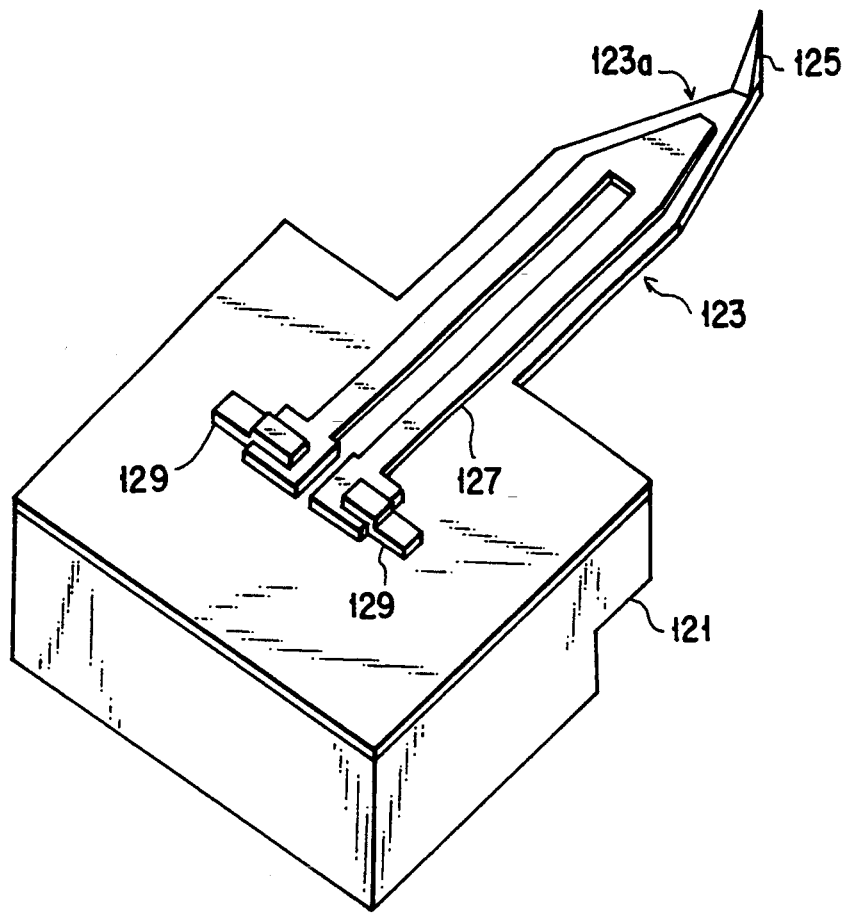
F I G. 7A
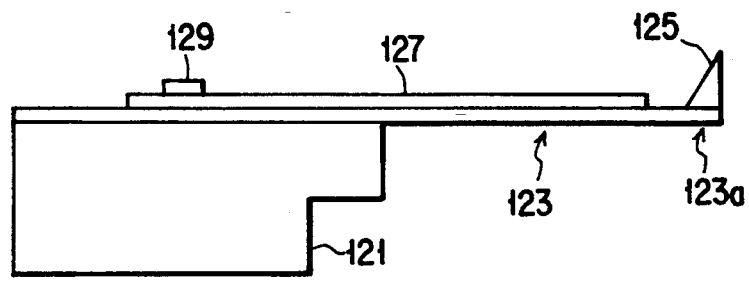
F I G. 7B

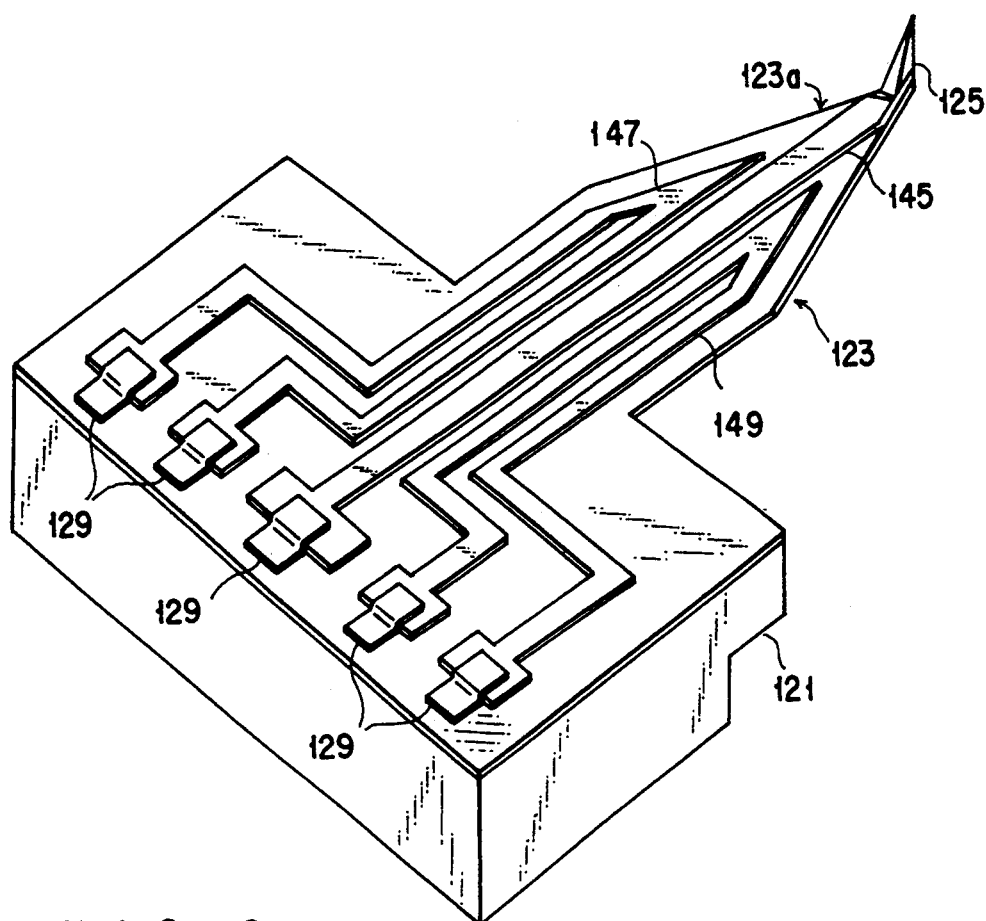
F I G. 9A
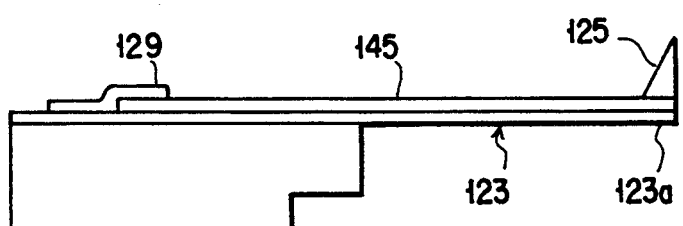
F I G. 9B
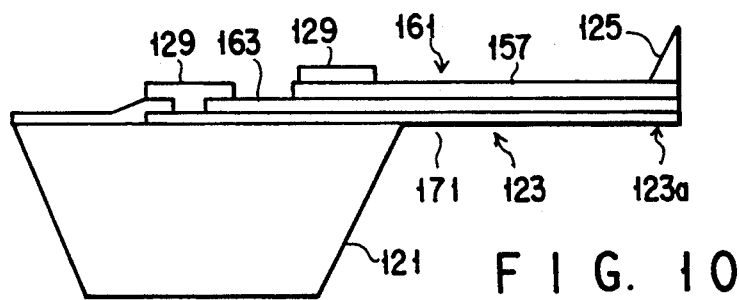
F I G. 10

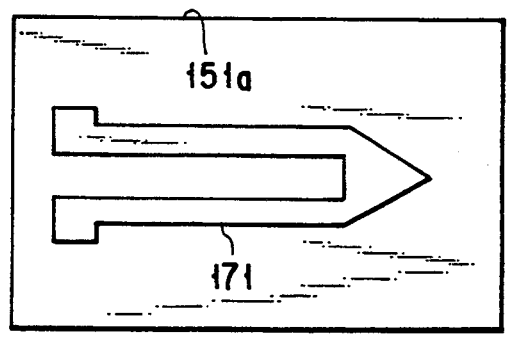
F I G. 11G
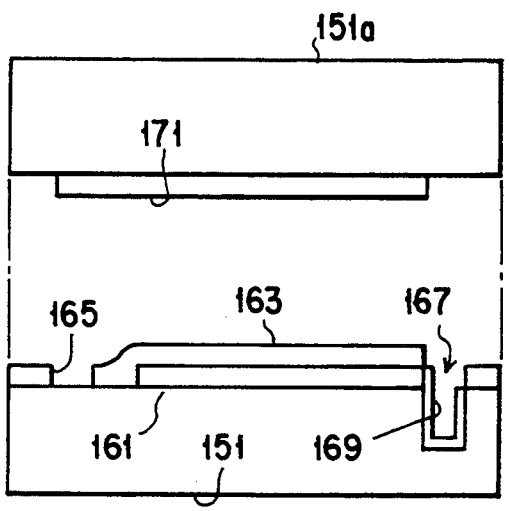
F I G. 11H
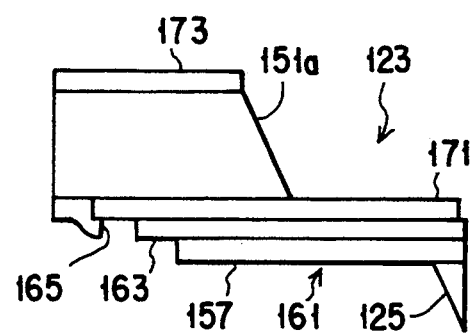
F I G. 11I
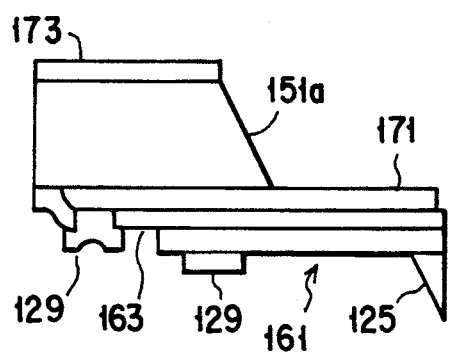
F I G. 11J

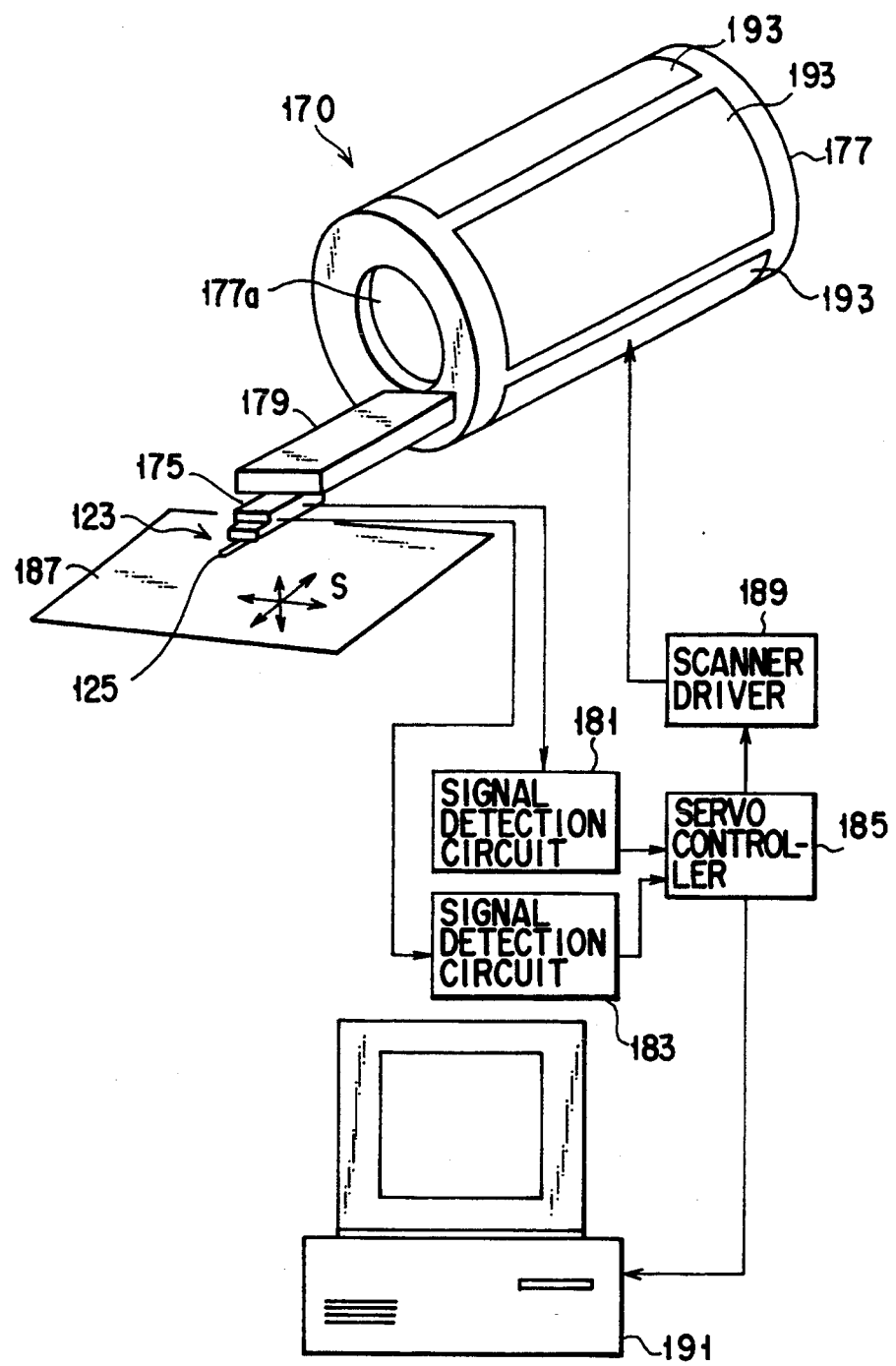
F I G. 12

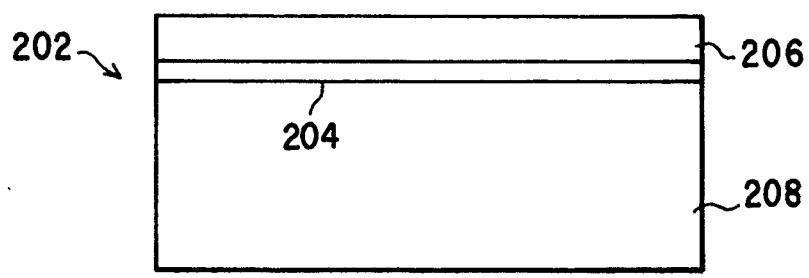
F I G. 15A
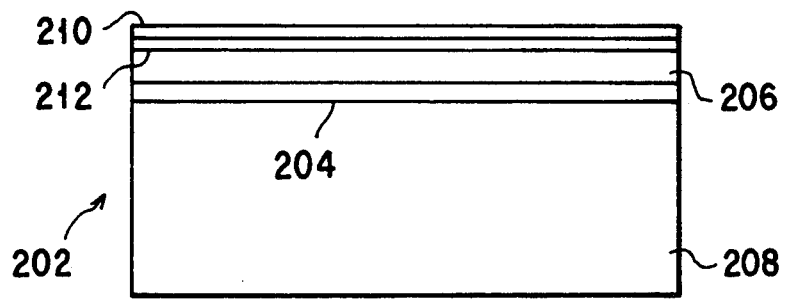
F I G. 15B
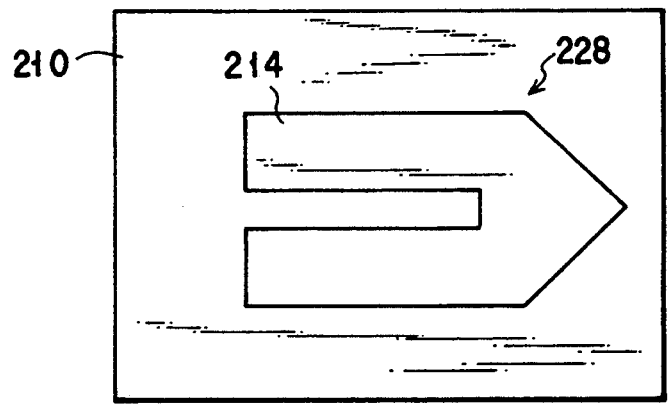
F I G. 15C

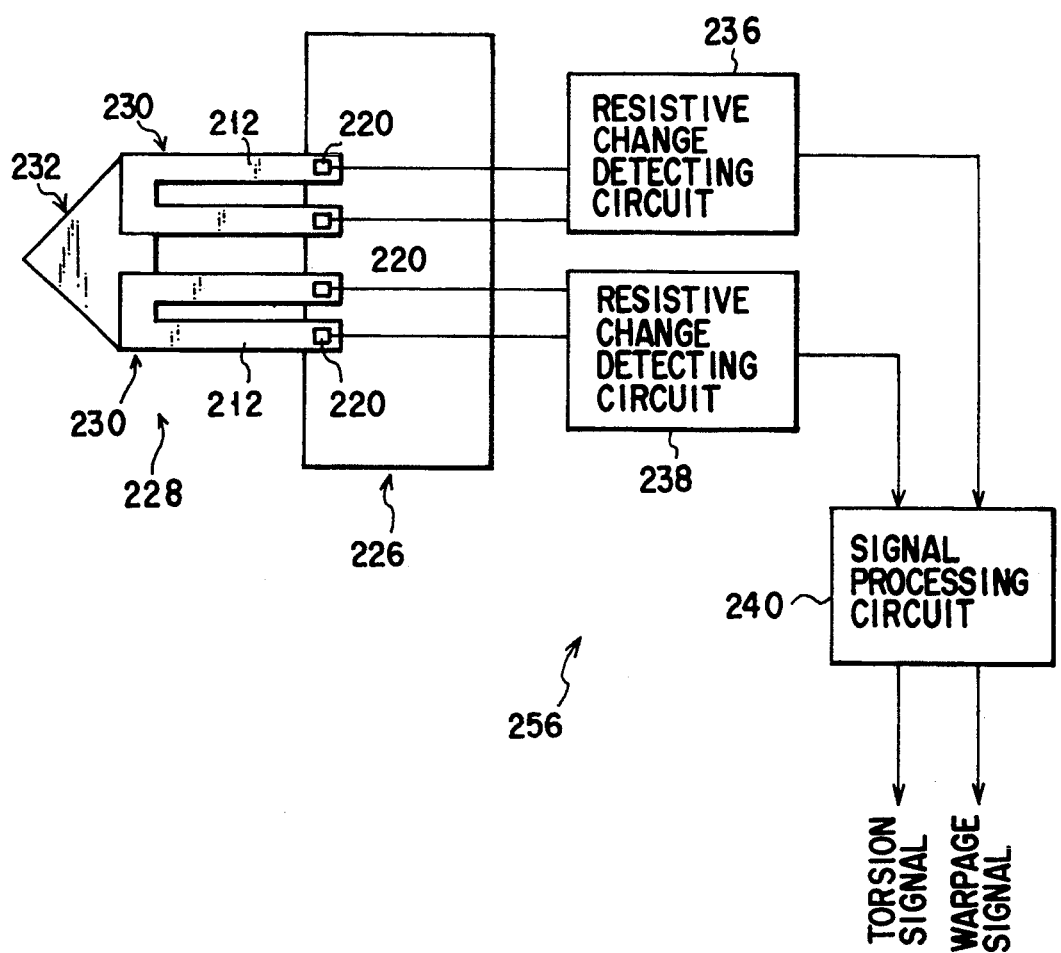
F I G. 16

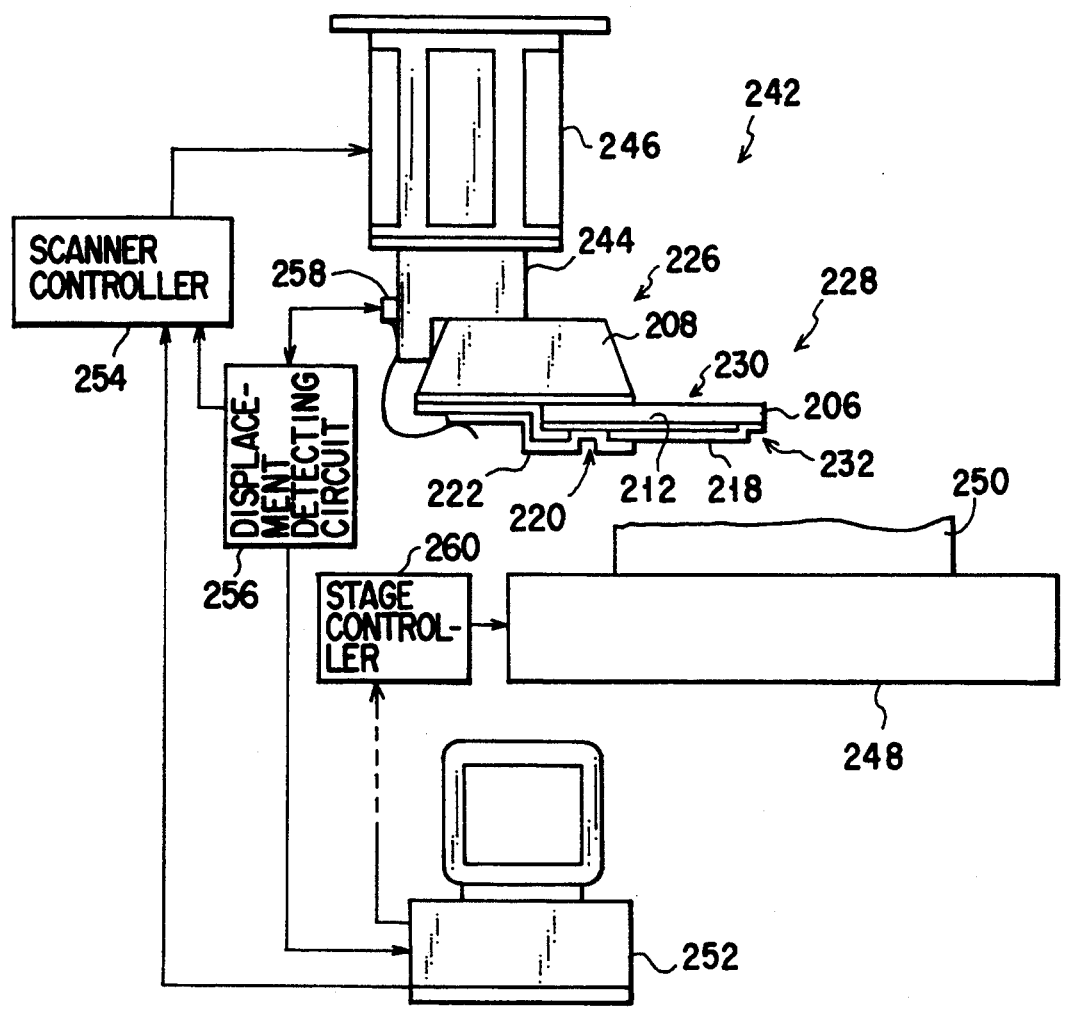
F I G. 17

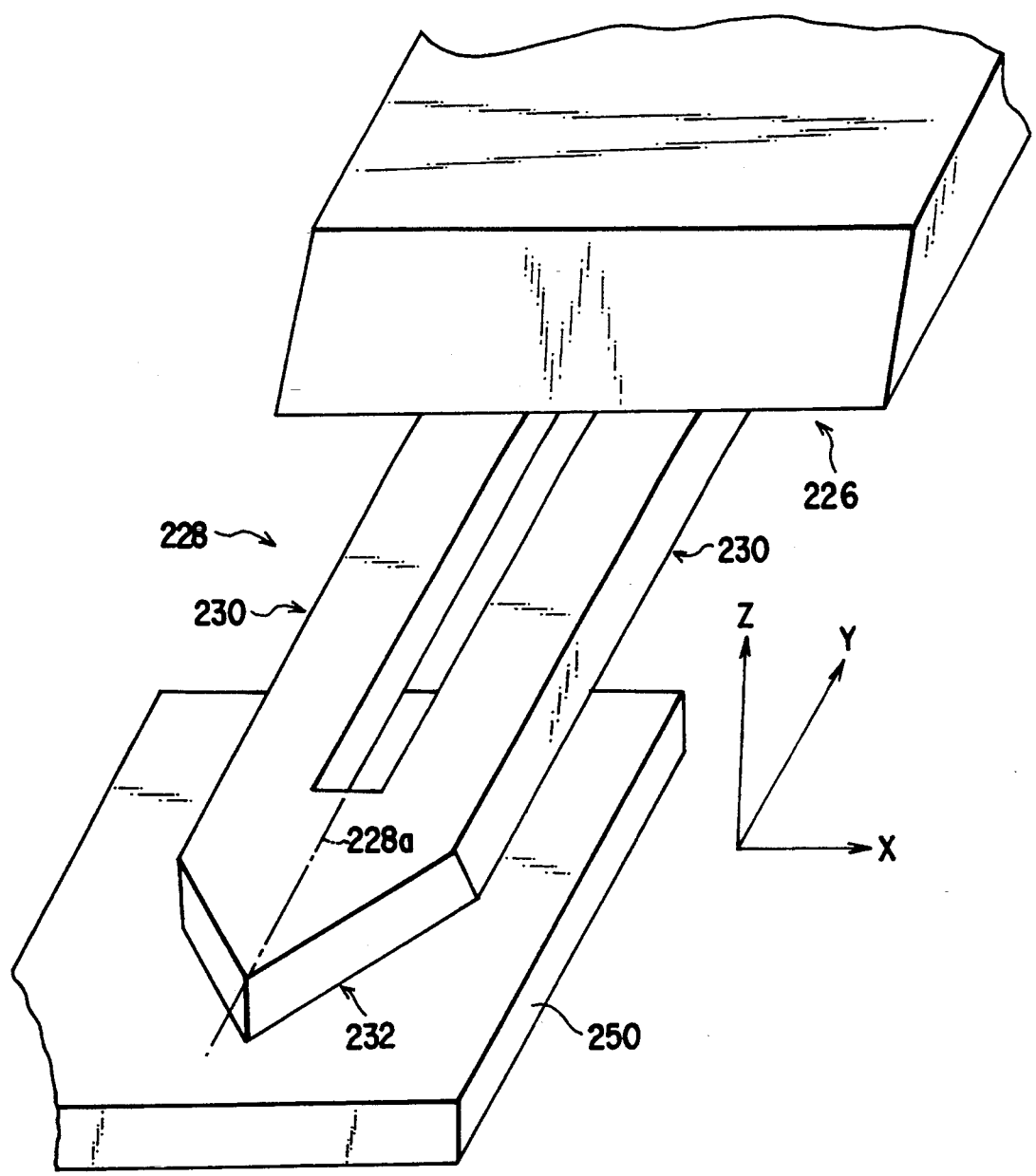
F I G. 18

INTEGRATED SPM SENSOR

This application is a continuation-in-part, of application Ser. No. 07/998,912, filed Dec. 30, 1992, now abandoned.

BACKGROUND OF THE INVENTION

1. Field of the Invention

The present invention relates to an integrated AFM sensor used in an atomic force microscope.

2. Description of the Related Art

As an apparatus capable of observing a conductive sample in a resolving power of an atomic order, an STM (Scanning Tunneling Microscope) was devised by Binnig and Rohrer et al. In this STM, a sample which can be observed is limited to a conductive one. For this reason, an AFM (Atomic Force Microscope) is proposed as an apparatus which can observe an insulating sample at a resolving power of an atomic order by using STM element techniques such as a servo technique. This AFM is disclosed in U.S. Pat. No. 4,724,318.

The AFM includes a cantilever having a sharp projection portion (probe) at its free end. When the probe is brought close to a sample, the free end of the cantilever is displaced by interaction (interatomic force) acting between atoms of the distal end of the probe and atoms of the surface of the sample. While the displacement of the free end is electrically or optically measured, when the probe scans the sample along the surface of the sample, three-dimensional information about the sample can be obtained. For example, when the probe scans the sample while the distance between the probe and the sample is controlled to keep the displacement of the free end constant, the distal end of the probe moves along the uneven surface of the sample. Therefore, a three-dimensional image representing the surface shape of the sample can be obtained from the positional information of the distal end of the probe.

In the AFM, a displacement measuring sensor for measuring the displacement of a cantilever is generally arranged independently of the cantilever. In recent years, an integrated AFM sensor in which a function capable of measuring the displacement is added to a cantilever itself is proposed by M. Tortonese et al. The integrated AFM sensor is disclosed in, e.g., "M. Tortonese, H. Yanada, R. C. Barrett and C. F. Quate, Transducers and Sensors' 91: Atomic Force Microscopy Using a Piezoresistive Cantilever".

Since the integrated AFM sensor has a very simple and small structure, the AFM sensor is expected to constitute a so-called stand-alone AFM having a movable cantilever. In a conventional AFM, since a relative positional relationship between the probe at the distal end of the cantilever and the sample is changed by causing the sample to move in X and Y directions, the maximum size of the sample is limited to about several centimeters. The stand-alone AFM can be advantageously free from the limit of the sample size.

In the integrated AFM sensor, the probe is not particularly arranged at the free end of the cantilever, and the distal end of the cantilever is formed into the shape of a triangle, though it has a planar structure, and the triangular end is brought close to a target sample, thereby performing AFM measurement. However, in this measurement, a high resolving power in the direction of the sample surface cannot be expected.

In addition, in a method of manufacturing the integrated AFM sensor, a support portion for holding a cantilever is formed by one silicon wafer, and the thickness, length, and the like of each part cannot be standardized at high accuracy. More specifically, the thicknesses of commercially available 4-inch-diameter silicon wafers which are popularly used have large variations, i.e., about 525 $\mu$m $\pm 20$ $\mu$m. In integrated AFM sensors, since silicon wafers are etched to form cantilevers, the lengths of the cantilevers have variations depending on the variations in thicknesses of the silicon wafers. As a result, sensors each having a high resolving power cannot be provided.

In recent years, in a normal AFM, during AFM measurement, a tunnel current flowing between a sample and a probe is monitored while the AFM measurement is performed, thereby simultaneously performing AFM/STM measurement. In addition, a capacitance between the probe and the sample is detected to perform AFM/SCaM (Scanning Capacitance Microscopy) measurement. However, in an integrated AFM sensor, since two or more types of signals cannot be captured at a high resolving power, the AFM/STM simultaneous measurement and the AFM/SCaM measurement cannot be performed.

In an AFM, the distal end of the cantilever is brought maximally close to the surface of the sample to perform scanning, and the atoms of the sample surface cause a repulsive force and an attractive force to act on the atoms of the distal end of the cantilever. Since the 10 repulsive force and attractive force acting on the atoms act in the surface normal direction of the uneven portion of the sample surface and are changed every scanning moment, non-uniform torsion occurs in the cantilever. The image of the sample surface obtained on the basis of the warpage of the cantilever is caused to be inaccurate by the torsion in the cantilever. For this reason, the following attempt is performed in the normal AFM. That is, the torsion of the cantilever is detected and corrected, thereby obtaining a more accurate image of a sample. However, the integrated AFM sensor does not have a function of detecting this torsion of the cantilever.

SUMMARY OF THE INVENTION

It is a main object of the present invention to provide an integrated AFM sensor capable of measuring a sample at a high resolving power.

It is another object of the present invention to provide an integrated AFM sensor having small variations in lengths of cantilevers.

It is still another object of the present invention to provide an integrated AFM sensor capable of detecting not only an interatomic force but another physical quantity such as a tunnel current and allowing AFM/STM simultaneous measurement.

It is still another object of the present invention to provide an integrated AFM sensor capable of detecting the torsion of a cantilever.

According to the present invention, an integrated AFM sensor comprises an elastically deformable cantilever having a free end portion; first detecting means for detecting displacement of a right side portion of said cantilever, with respect to a central longitudinal axis of said cantilever, and for producing a first detection signal which is a function of a detected displacement of said right side portion; and second detecting means for detecting displacement of a left side portion of said cantilever, with respect to said central longitudinal axis of said cantilever, and for producing a second detection signal which is a function of a detected displacement of said left side portion, whereby torsion of said cantilever is detected on the basis of said detection signals obtained from said first and second detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3J are views for explaining the steps in manufacturing the integrated AFM sensor shown in FIGS. 1A to 1C;

FIG. 4A is a perspective view showing an integrated AFM sensor according to the second embodiment of the present invention;

FIG. 4B is a plan view showing the integrated AFM sensor in FIG. 4A;

FIG. 5A is a perspective view showing an integrated AFM sensor according to the third embodiment of the present invention;

FIG. 5B is a plan view showing the integrated AFM sensor in FIG. 5A;

FIG. 7A is a perspective view showing an integrated AFM sensor according to the fourth embodiment of the present invention;

FIG. 7B is a sectional side view showing the integrated AFM sensor in FIG. 7A;

FIG. 9A is a perspective view showing an integrated AFM sensor according to the fifth embodiment of the present invention;

FIG. 9B is a sectional side view showing the integrated AFM sensor in FIG. 9A;

FIG. 10 is a sectional side view showing an integrated AFM sensor according to the sixth embodiment of the present invention;

FIGS. 11A to 11J are views for explaining the steps in manufacturing the integrated AFM sensor shown in FIG. 10;

FIG. 12 schematically shows an arrangement of an AFM measurement system in which an integrated AFM sensor according to the seventh embodiment of the present invention is incorporated;

FIGS. 15A to 15I are views for explaining the steps in manufacturing the integrated AFM sensor shown in FIGS. 14A and 14B;

FIG. 16 is a block diagram of a displacement detecting circuit applied to the integrated AFM sensor shown in FIGS. 14A and 14B;

FIG. 17 shows an arrangement of an AFM in which the integrated AFM sensor in FIGS. 14A and 14B is incorporated;

FIG. 18 is an enlarged perspective view showing an enlarged part of the cantilever of the integrated AFM sensor incorporated in the AFM in FIG. 17;

DETAILED DESCRIPTION OF THE PREFERRED EMBODIMENTS

Figure 1A:
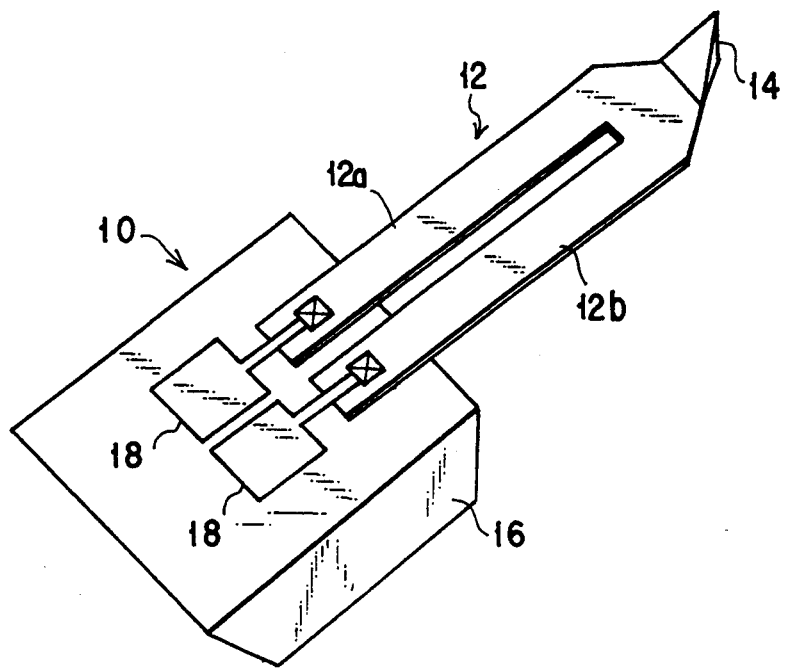
FIG. 1A is a perspective view showing an integrated AFM sensor according to the first embodiment of the present invention.
Figure 1C:
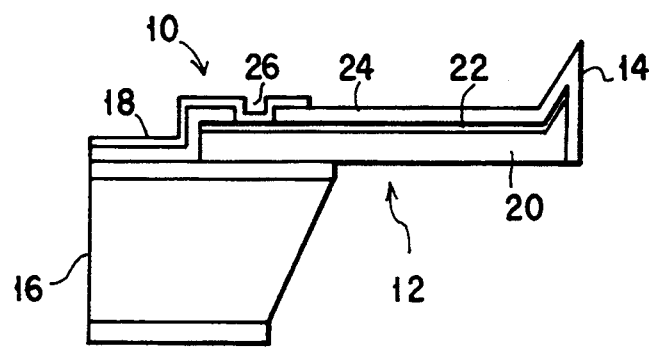
FIG. 1C is a sectional side view showing the integrated AFM sensor in FIG. 1A.
Figure 1B:
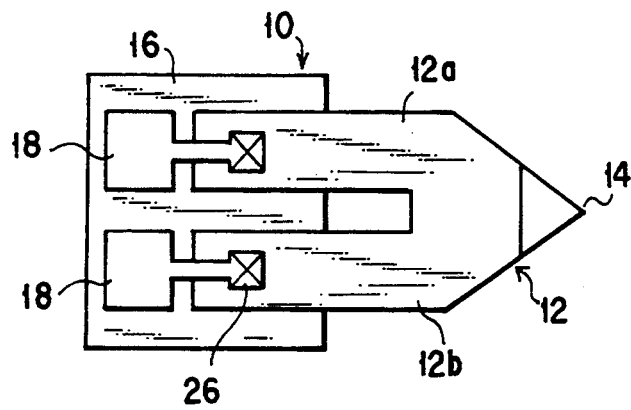
FIG. 1B is a plan view showing the integrated AFM sensor in FIG. 1A.

An integrated AFM sensor according to the first embodiment of the present invention will be described below. As shown in FIGS. 1A to 1C, an integrated AFM sensor 10 has a cantilever 12. The cantilever 12 has two beams 12a and 12b extending from a support portion 16. The two beams 12a and 12b are integrated at their distal ends to form a triangular free end, and a probe 14 having a sharp end is arranged at the free end. This cantilever 12 is formed by stacking a passivation layer 24 and a piezoresistive layer 22. At the fixed end of the cantilever 12, electrodes 18 electrically connected to the piezoresistive layer 22 through contact holes 26 are arranged.

In the integrated AFM sensor according to the present invention, since the probe 14 is arranged at the free end of the cantilever 12, a high resolving power can be obtained in not only a vertical direction but a horizontal direction. In addition, in a conventional integrated AFM sensor having no probe, the sensor must be mounted to be inclined at a considerably large angle such that the sensor except for the distal end of the cantilever is not brought into contact with a sample. In the integrated AFM sensor of the present invention, since the probe 14 projects from the surface of the cantilever 12, the cantilever 12 is rarely brought into contact with the sample, and the sensor can be arranged in parallel relationship to the sample, thereby increasing a resolving power.

Figure 2:
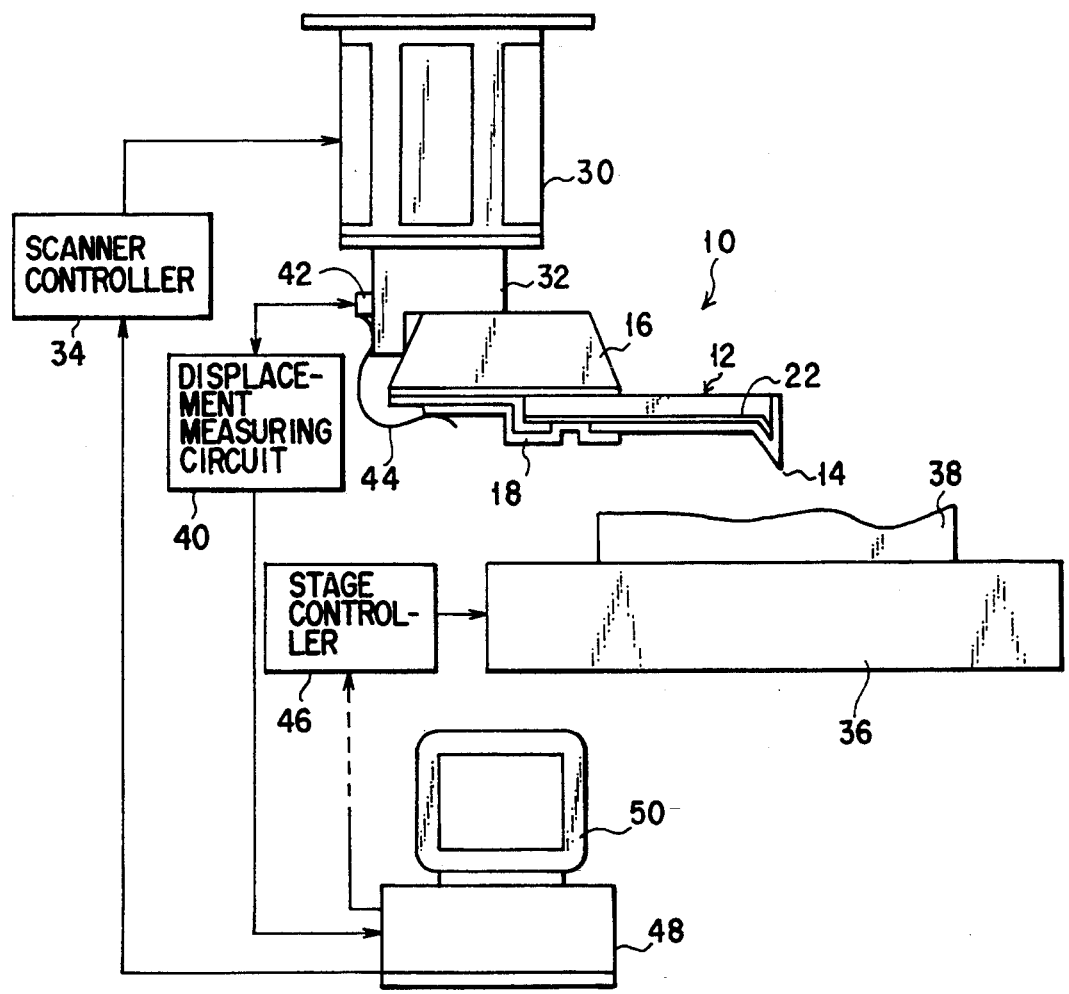
FIG. 2 shows an arrangement of an AFM in which the integrated AFM sensor shown in FIGS. 1A to 1C is incorporated.

An atomic force microscope in which the integrated AFM sensor 10 is incorporated will be described below. As shown in FIG. 2, the integrated AFM sensor 10 is connected to a tube scanner 30 through a fixing jig 32. The probe 14 at the distal end of the cantilever 12 is arranged close to the surface of a sample 38 placed on a sample table 36, and the tube scanner 30 which is deformed depending on a voltage applied from a scanner controller 34 scans the sample 38 in X, Y, and Z directions.

A displacement measuring circuit 40 comprises a voltage applying circuit and a current detecting circuit. The voltage applying circuit is electrically connected to the piezoresistive layer 22 of the integrated AFM sensor 10 through the electrodes 18 and applies a predetermined DC voltage. A current flowing upon application of the voltage is always measured by the current detecting circuit in the displacement measuring circuit 40. During a scanning operation performed by the probe 14, when the cantilever 12 is displaced by the uneven portion of the sample 38, since the resistivity of the piezoresistive layer 22 is changed depending on this displacement, a current flowing in the piezoresistive layer 22 is changed. Therefore, when a change in current value measured by the current detecting circuit in the displacement measuring circuit 40 is detected, the displacement of the cantilever 12 is measured.

An output signal representing the displacement of the cantilever 12 and output from the displacement measuring circuit 40 is received by a computer 48. The computer 48 performs digital feedback control of movement of the tube scanner 30 by the scanner controller 34, e.g., controls the interval between the probe 14 and the sample 38 constant, or controls contact pressure of the probe 14 with the sample 38 constant, on the basis of this output signal. A stage controller 46 is arranged to cause the sample table 36 to coarsely move. The computer 48 controls the scanner controller 34 and the stage controller 46 and performs image processing on the basis of the control signals of these controllers and the signal from the displacement measuring circuit 40 to form the observation image of the sample 38, and the computer 48 displays the observation image on a monitor 50.

Figure 3A:
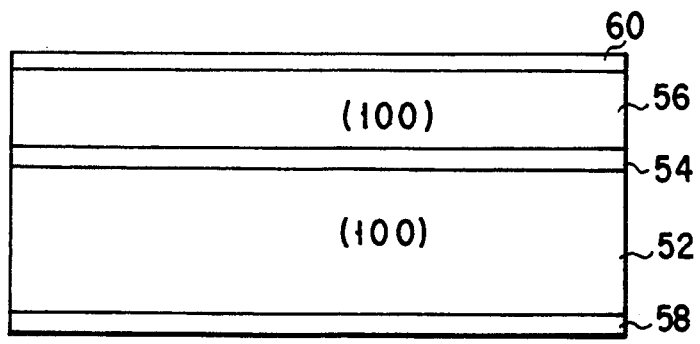

Subsequently, a method of manufacturing the integrated AFM sensor shown in FIGS. 1A to 1C will be described below with reference to FIGS. 3A to 3J. 10 As a starting wafer, a wafer, which is one of SOI (Silicon On Insulator) wafers, formed by bonding silicon layers is prepared. An upper silicon layer 56 of the wafer is doped with phosphorus (P) and of an n-type, and has a thickness of 20 $\mu$m. Each of a silicon layer 52 under a silicon oxide isolation layer 54 and the silicon layer 56 on the isolation layer 54 has the (100) direction. After this wafer is washed, $SiO_2$ films 58 and 60 are formed on the upper and lower surfaces of the wafer by deposition in a diffusion furnace (FIG. 3A).

Figure 3B:
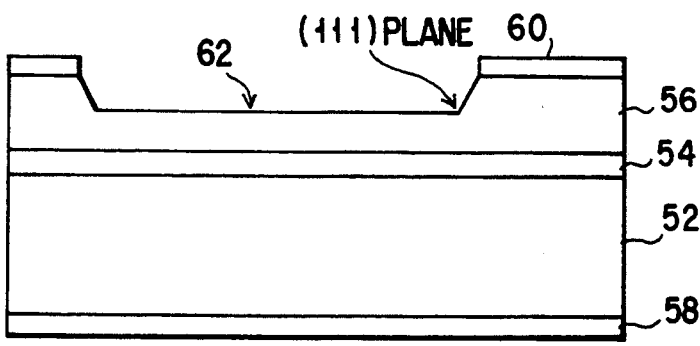

The upper $SiO_2$ film 60 is patterned to form a rectangular opening, and the silicon layer 56 is anisotropically etched by EDP (Ethylene Diamine Pyrocatechol water) using the $SiO_2$ layer 60 as a mask to form a recessed portion 62 whose minimum thin portion has a thickness of about 3 $\mu$m, and each of inclined surfaces of the recessed portion 62 has the (111) direction (FIG. 3B).

Figure 3C:
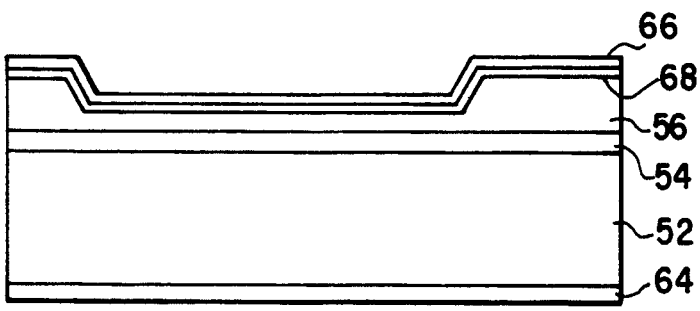

The $SiO_2$ layers 58 and 60 on the upper and lower surfaces of the wafer are temporarily removed, and $SiO_2$ layers 64 and 66 each having a thickness of 100 nm are formed on the upper and lower surfaces of the wafer, respectively. Boron (B) is implanted in the upper surface of the silicon layer 56 at a dose of about $10^{15}$ ions/cm$^2$ to form a piezoresistive layer 68 (FIG. 3C).

Figure 3D:
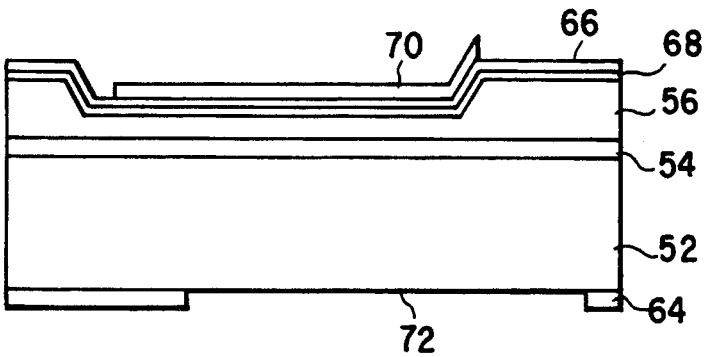
Figure 3E:
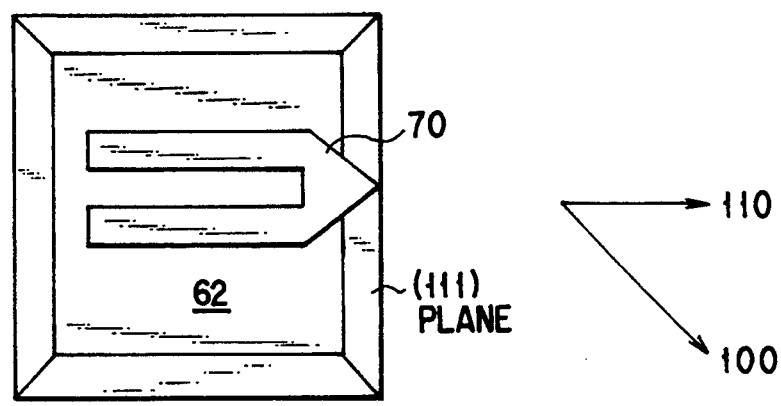

The $SiO_2$ layer 66 is coated with a thick-film resist 70 having a thickness of 10 $\mu$m, and the thick-film resist 70 is patterned using an inclined surface of the recessed portion 62 to form a probe. At this time, the resist has the patterning shape extending in the (110) direction of the silicon wafer as shown in FIG. 3E. An opening 72 is formed in the $SiO_2$ layer 64 on the lower surface of the wafer (FIG. 3D).

Anisotropic plasma dry etching is performed to the resultant structure by $SF_6+CF_3Br$ up to the isolation layer 54 using the resist 70 as a mask to entirely remove the silicon layer 56. After the resist 70 is removed, an $SiO_2$ layer 74 for passivation is deposited on the surface of the resultant structure (FIG. 3F).

In order to extract electrodes from the piezoresistive layer 68, contact holes 76 are formed in the $SiO_2$ layers 74 and 66 (FIG. 3G), and aluminum is deposited by sputtering to form electrodes 78 (FIG. 3H).

The upper surface of the wafer is covered with polyimide 80, and the silicon layer 52 is anisotropically etched by EDP up to the isolation layer 54 using the $SiO_2$ layer 64 having the opening 72 (FIG. 3I) as a mask.

Figure 3J:
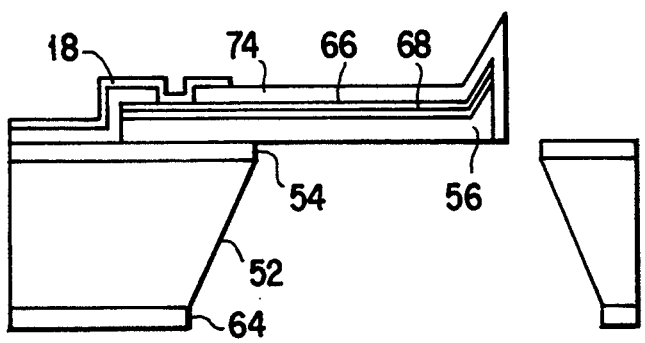

Finally, as shown in FIG. 3J, when the silicon oxide isolation layer 54 is etched by buffered hydrofluoric acid to be removed, and the polyimide 80 is removed, the integrated AFM sensor shown in FIGS. 1A to 1C can be obtained.

An integrated AFM sensor according to the second embodiment of the present invention is shown in FIGS. 4A and 4B. This integrated AFM sensor is obtained such that a probe of an integrated AFM sensor manufactured by the same processes as those of the first embodiment is processed using an FIB (Focused Ion Beam) apparatus to sharpen the shape of the distal end of a probe 14. In this manner, AFM measurement can be performed at a higher resolving power.

Figure 6:
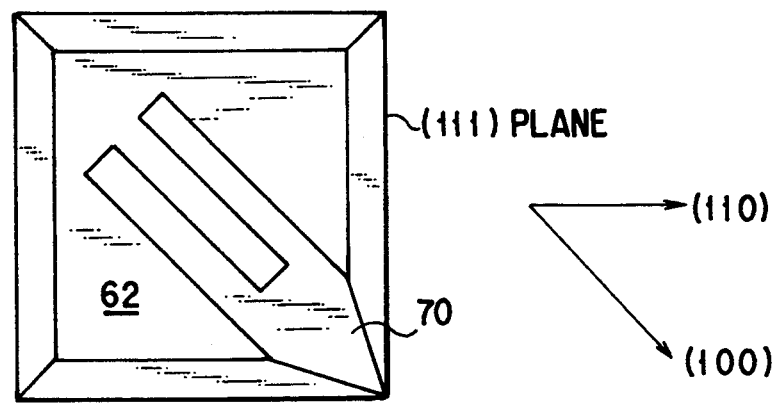
FIG. 6 shows a patterning shape of a resist used for manufacturing the integrated AFM sensor shown in FIGS. 5A and 5B.

An integrated AFM sensor according to the third embodiment of the present invention is shown in FIGS. 5A and 5B. In this embodiment, a p-type silicon layer formed by isotropically implanting arsenic (As) is used as a piezoresistive layer. Since p-type silicon has a high piezo coefficient in the (100) direction, this direction is selected as the extending direction of a cantilever 12. The integrated AFM sensor of this embodiment is manufactured in the same processes as those of the first embodiment except for the following two points. First, in the step in FIG. 3C, a piezoresistive layer is formed by implanting arsenic in place of boron. Second, in the step in FIG. 3D, a resist 70 is patterned to extend in the diagonal direction of a recessed portion 62 such that the distal end of the resist 70 reaches one of the corners of the recessed portion 62 as shown in FIG. 6. In the integrated AFM sensor manufactured as described above, since the probe is formed using the corner of the recessed portion, the probe has the shape shown in FIGS. 5A, 5B, and 6. The integrated AFM sensor of this embodiment manufactured as described above can perform AFM measurement at a high resolving power in the vertical and horizontal directions.

An integrated AFM sensor according to the fourth embodiment of the present invention will be described below.

The integrated AFM sensor of this embodiment, as shown in FIGS. 7A and 7B, comprises a support portion 121 detachably mounted in an atomic force microscope (not shown), a cantilever 123 extending from the support portion 121 and consisting of, e.g., silicon nitride, a probe 125 consisting of silicon and arranged on a distal end portion 123a of the cantilever 123, a resistive layer 127 extending from the support portion 121 to the distal end portion 123a of the cantilever 123 to have an almost U shape and having a resistance changed depending on the displacement of the cantilever 123, and electrode portions 129 for applying a predetermined voltage to the resistive layer 127. Note that the resistive layer 127 consists of silicon doped with boron (B).

The probe 125 has the shape of a triangular pyramid, i.e., a tetrahedron, and its degree of sharpness is set to be higher than that of a conventional probe. For this reason, measurement having a high resolving power can be obtained.

A method of manufacturing the integrated AFM sensor of this embodiment arranged as described above will be described below with reference to FIGS. 8A to 8K. Note that the right-and-left direction in FIGS. 8A to 8K is set to be the (110) direction.

Figure 8A:
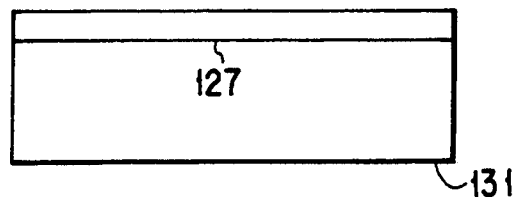
FIGS. 8A to 8K are views for explaining the steps in manufacturing the integrated AFM sensor shown in FIGS. 7A and 7B.
Figure 8B:
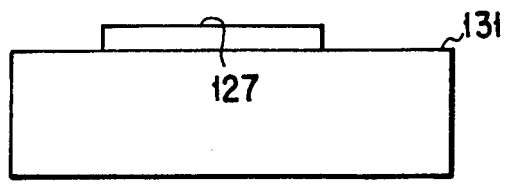

A silicon wafer 131 is prepared as a starting wafer, and boron (B; at a concentration of $10^{20}$ atoms/cm$^3$ or more) is doped in the surface of the silicon wafer 131 to form the resistive layer 127 having a thickness of 1 μm (FIG. 8A).

Figure 8C:
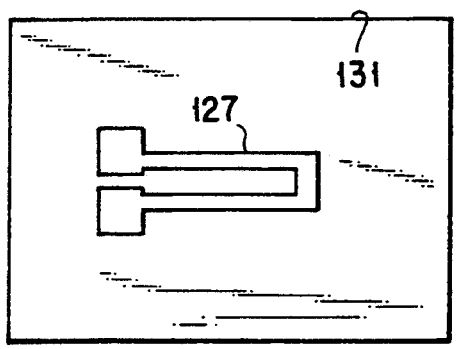
Figure 8D:
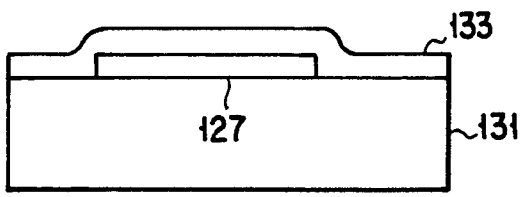

The resistive layer 127 is dry-etched (FIG. 8B), and is patterned in the shape shown in FIG. 8C. As a result, the outline of the resistive layer 127 shown in FIG. 7A is formed.

Figure 8E:
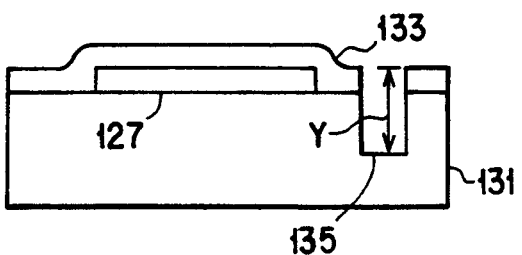
Figure 8F:
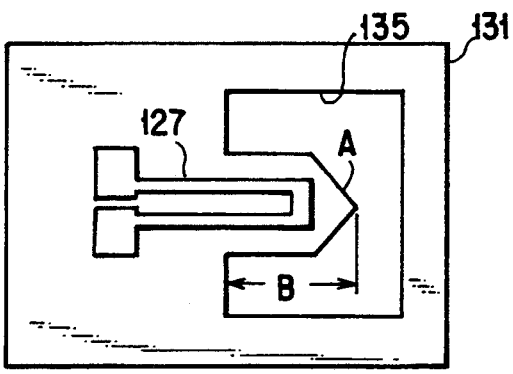

After a silicon nitride layer 133 having a thickness of 1 μm is formed by LPCVD on the surface of the silicon wafer 131 on which the resistive layer 127 is formed (FIG. 8D), the resultant structure is dry-etched, as shown in FIGS. 8E and 8F, to partially remove the silicon nitride layer 133 and the silicon wafer 131, thereby forming the outline of the cantilever 123 (FIG. 7A). The removed portion has a depth Y (FIG. BE) which is 5 μm. Since the length of the probe 125 (FIGS. 7A and 7B) is determined by the depth Y, when a long probe is required, the etching must be performed more deeply. In FIG. 8F, for descriptive convenience, a state wherein the silicon nitride layer 133 is removed is shown.

As shown in FIG. 8F, a distal end A of a portion remaining in the shape of a cantilever by etching has a triangular shape, and the length of the remaining portion is 250 μm. The cantilever 123 (FIG. 7A) constituted by the remaining portion (portion of a range represented by reference symbol B) generally has a length B which is designed to be 100 μm to 500 μm such that spring modulus is set to be about 0.01 to 10 N/m. However, the cantilever 123 can be designed to be longer according to the thickness of the silicon nitride layer 133 (FIG. 8E).

Figure 8G:
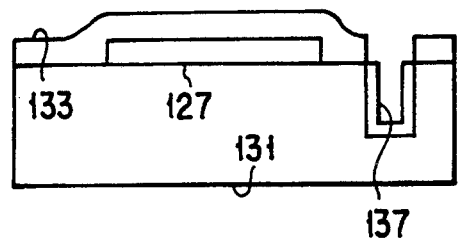

The silicon wafer 131 processed as described above is heated to 950° C. in a thermal diffusion furnace, and a silicon surface 135 exposed in the process shown in FIG. 8E is oxidized to form a silicon oxide film 137 (FIG. 8G).

Figure 8H:
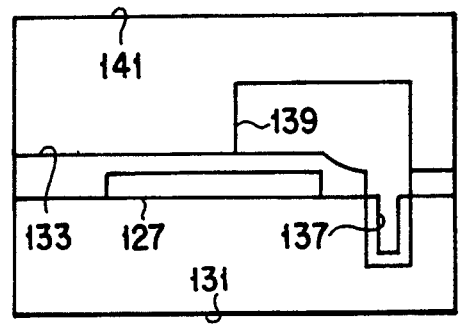

Thereafter, a pyrex glass (Corning #7740) 141 having one surface in which a groove 139 is formed by a dicing saw in advance is combined to the silicon nitride layer 133 by anodization bonding (FIG. 8H). After this anodization bonding, the pyrex glass 141 is shaped again by the dicing saw to have the shape shown in FIG. 8I.

Figure 8I:
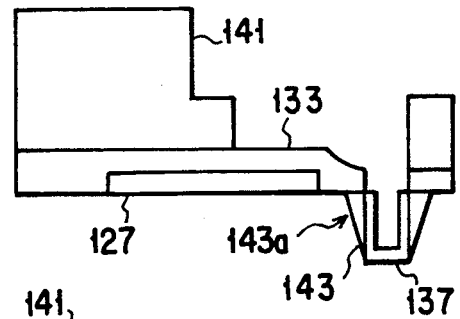

In addition, the silicon wafer 131 is dipped in an aqueous potassium hydroxide solution to etch the silicon wafer 131. In a portion where the resistive layer 127 is not present, the etching is stopped while the silicon nitride layer 133 remains. In a portion where the resistive layer 127 is present, the etching is stopped at a portion having a concentration of about $10^{20}$ atoms/cm$^3$ in the resistive layer 127 serving as a etching stopper layer. The silicon wafer 131 at a position where the silicon oxide film 137 is formed is processed in the shape of a tetrahedron while one surface of the silicon wafer 131 is covered with the silicon oxide film 137 (FIG. 8I). A portion 143 processed in the shape of a tetrahedron is to be used as the probe 125 (FIGS. 7A and 7B) in the later processes. Note that one of the inclined surfaces 143a of the portion represented by reference numeral 143 has the (111) direction.

Figure 8J:
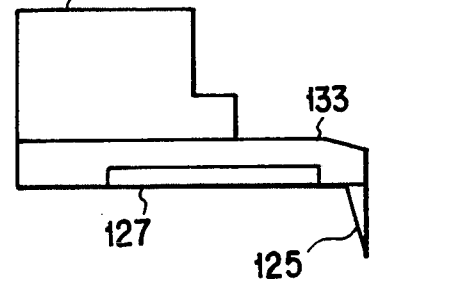

Thereafter, the oxide silicon film 137 is etched by hydrofluoric acid to leave the portion 143 of the oxide silicon film 137. As a result, the probe 125 is formed at the distal end of the nitride silicon layer 133 (FIG. 8J).

Figure 8K:
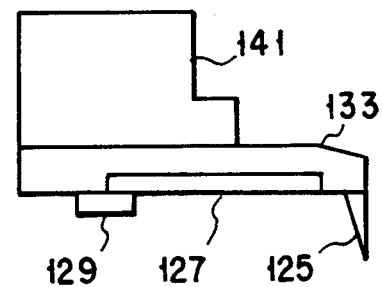

Finally, electrode portions 129 consisting of aluminum are formed at the proximal end portions of the resistive layer 127, respectively. An oxide silicon film or the like may be formed as a protecting layer on the surface of the resultant structure. As a result, the integrated AFM sensor shown in FIGS. 7A and 7B is formed (FIG. 8K). Note that the pyrex glass 141 remaining after the above processes prospectively serves as the support portion 121 (FIGS. 7A and 7B).

As described above, in the integrated AFM sensor of this embodiment, the support portion 121 is formed by applying the bonding technique (anodization bonding) shown in the process shown in FIG. 8H. For this reason, the integrated AFM sensor of the embodiment can be manufactured by a method easier than a conventional manufacturing method suggested by M. Tortonese et al., in which a sensor with no probe is formed by silicon as a whole.

That is, since a semiconductor IC process is a process for processing the surface of a silicon wafer, the semiconductor IC process is a method very suitable for forming the cantilever 123. However, this process is not always suitable for forming the support portion 121. Therefore, according to this embodiment, the anodization bonding is applied, and a process for bonding the silicon nitride layer 133 to the pyrex glass 141 which is to be formed into the support portion 121 is used, thereby facilitating the manufacturing processes.

In addition, in a conventional technique, the silicon wafer is etched by an aqueous potassium hydroxide solution or the like to extend through the silicon wafer from the lower direction. However, in the process in FIG. 8I, since the resistive layer 127 doped with boron at a concentration of about $10^{20}$ atoms/cm$^3$ is also used as an etching stopper layer, the manufacturing processes of the embodiment is designed to be facilitated.

In addition, since the probe 125 can be formed in the process of forming the support portion 121 and the cantilever 123 at the same time, the manufacturing processes of the embodiment are designed to be facilitated. Furthermore, since the probe 125 formed into the shape of a tetrahedron by self-alignment and formed at the end portion 123a of the cantilever 123 in the process of forming the support portion 121 and the cantilever 123 is formed such that its three ridges cross each other at the top of the probe 125, the probe 125 can be formed to have an end sharper than that of the conventional probe. A resolving power in AFM measurement depends on the degree of sharpness of a probe. The integrated AFM sensor of this embodiment to which the probe 125 is applied can perform AFM measurement at a high resolving power.

Since the alignment accuracy between the support portion 121 and the cantilever 123 can be set to be an optimal small value of several μm, variations in thickness and length are eliminated. An integrated AFM sensor having the desirably designed cantilever 123 can be provided.

In the above embodiment, the electrode portions 129 are formed in the final process. However, the following process can be applied. That is, before anodization 10 bonding, contact holes are formed in the silicon nitride layer 133, a metal is deposited on the silicon nitride layer 133 to form electrodes connected to the resistive layer 127, and the pyrex glass 141 on which a metal is deposited or patterned in advance is electrically connected to the resistive layer 127 simultaneously with the anodization bonding.

An integrated AFM sensor according to the fifth embodiment of the present invention will be described below with reference to FIGS. 9A and 9B. In the description of this embodiment, the same reference numerals as in the fourth embodiment denote the same parts in the fifth embodiment, and a description thereof will be omitted.

The integrated AFM sensor of this embodiment is constituted such that, in addition to AFM measurement, STM and SCaM are performed simultaneously with LFM measurement (Lateral Force Microscopy).

As shown in FIGS. 9A and 9B, the fifth embodiment is different from the fourth embodiment by the following points. A p-type wafer is used as a starting wafer, and a plurality of first to third resistive layers 145, 147, and 149 are used. In addition, since the p-type wafer is used as the starting wafer, a probe 125 itself has conductivity because the p-type wafer is used as the starting wafer and because a concentration distribution obtained by doping boron has a sufficient concentration at a portion of the probe 125.

In this embodiment, the probe 125 having the shape of a tetrahedron is formed on the first resistive layer 145, which serves as a conductive layer, formed to extend to a distal end portion 123a along the central portion of a cantilever 123, and is electrically connected to the first resistive layer 145. STM measurement or the like is performed by operating the first resistive layer 145 and the probe 125. In addition, the second and third resistive layers 147 and 149 which are respectively formed on both the surfaces of the first resistive layer 145 and each of which extends through the end portion 123a of the cantilever 123 are arranged symmetrically about the longitudinal axis of the cantilever 123, and are used for LFM measurement or the like.

Since the integrated AFM sensor having the above arrangement is formed in the same manner as that of the integrated AFM sensor of the fourth embodiment except for a method of patterning the first to third resistive layers 145, 147, and 149, and has the same operation and effect as those of the integrated AFM sensor of the fourth embodiment, a description thereof will be omitted.

In the integrated AFM sensor of this embodiment, STM measurement or SCaM measurement can be preferably selectively performed simultaneously with LFM measurement by applying the first to third resistive layers 145, 147, and 149.

The present invention is not limited to the above embodiment, and, for example, the following arrangement can be used. That is, a resistive layer for measuring a distortion signal of the cantilever can be formed on the surface of the cantilever 123 to prevent signal interference between the resistive layers.

An integrated AFM sensor according to the sixth embodiment of the present invention will be described below with reference to FIGS. 10 and 11A to 11J. In a description of this embodiment, the same reference numerals as in the fourth and fifth embodiments denote the same parts in the sixth embodiment, and a description thereof will be omitted.

As shown in FIG. 10, the integrated AFM sensor of this embodiment comprises resistive layers 161 consisting of first to third resistive layers 155, 157,159 (FIG. 11C) formed on the upper surface of a cantilever 123 and a fourth resistive layer 171 formed on the lower surface of the cantilever 123. A probe 125 is formed on the third resistive layer 157 of a distal end portion 123a of the cantilever 123. Electrode portions 129 are formed on the first, second, third, and fourth resistive layers 155, 157,159, and 171, respectively, and can be electrically connected to an external circuit (not shown).

A method of manufacturing the integrated AFM sensor of this embodiment having the above arrangement will be described below with reference to FIGS. 11A to 11J.

Figure 11A:
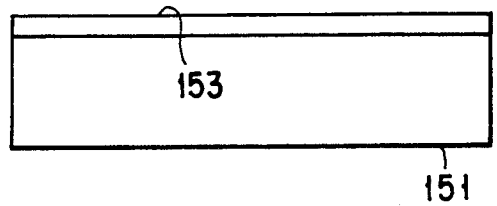
Figure 11B:
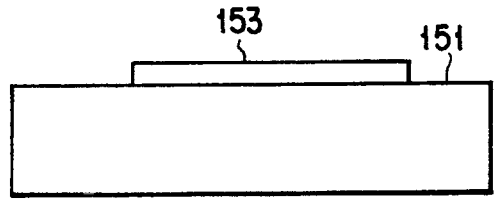

Two p-type silicon wafers 151 and 151a are prepared as starting wafers, boron is doped from the p-type silicon wafers 151 and 151a at a high concentration to form boron-doped layers 153 each having a thickness of 1 μm (FIG. 11A). Only one p-type silicon wafer 151 is shown in FIGS. 11A to 11F.

Figure 11C:
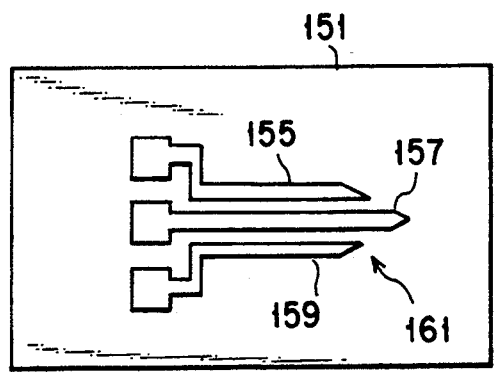
Figure 11D:
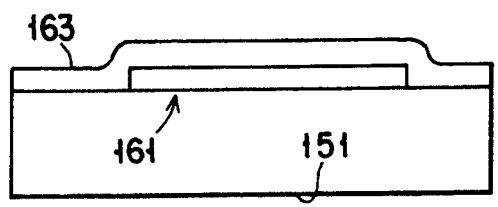

The boron-doped layer 153 of the p-type silicon wafer 151 is dry-etched (FIG. 11B) and patterned into the shape shown in FIG. 11C. As a result, the resistive layers 161 consisting of the first to third resistive layers 155, 157, and 159 for measuring the displacement of the cantilever 123 are formed on the p-type silicon wafer 151.

Figure 11E:
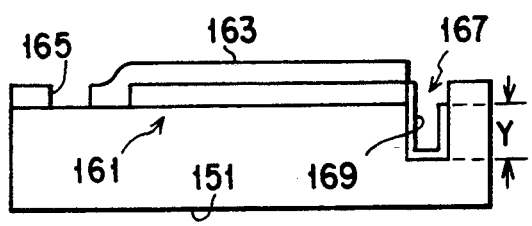
Figure 11F:
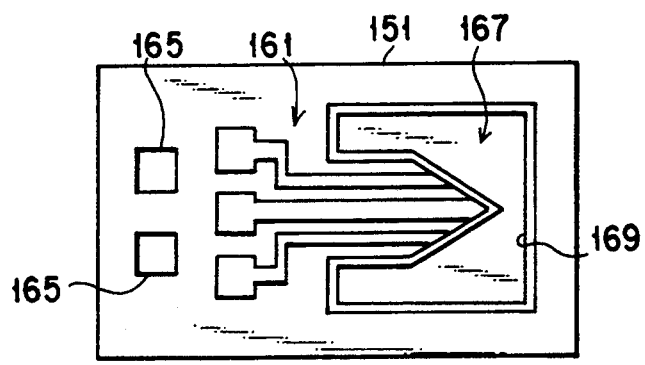

After a 1-μm thick silicon nitride layer 163 is deposited by LPCVD on the surface of the p-type silicon wafer 151 on which the resistive layers 161 are formed (FIG. 11D), the silicon nitride layer 163 on the proximal end side is partially removed by photolithography to form holes 165 having the shapes shown in FIG. 11F and used for electrode portions (FIG. 11E).

The silicon nitride layer 163 and the p-type silicon wafer 151 thereunder are etched to a predetermined depth such that the distal end portion 123a (referring FIG. 10) forms the outline of the triangular cantilever 123 (FIG. 10) into the outline shown in FIG. 11F (FIGS. 11E and 11F). More specifically, as shown in FIGS. 11E and 11F, a depth Y (FIG. 11) of a groove 167 formed by etching is 5 μm from the lower surface of the resistive layers 161.

Thereafter, the resultant structure is oxidized in a thermal diffusion furnace to form a silicon oxide layer 169 on the silicon surface exposed on the inner surface of the groove 167 (FIGS. 11E and 11F). Note that, for descriptive convenience, a state wherein the silicon nitride layer 163 is removed is shown in FIG. 11F.

The silicon wafer 151a on which the boron-doped layer 153 is formed in the process in FIG. 11A is prepared, and the boron-doped layer 153 is patterned to have the outline shown in FIG. 11G so as to form the fourth resistive layer 171.

As shown in FIG. 11H, the two silicon wafers 151 and 151a are combined to each other such that their processed surfaces are opposite each other.

Thereafter, the non-processed surface of the silicon wafer 151a is oxidized to form a silicon oxide film 173 (FIG. 11I), and is patterned. Wet anisotropic etching is performed to the two silicon wafers 151 and 151a by ethylenediamine pyrocatechol water such that the silicon wafer 151a remains in the shape of the support portion 121 (FIG. 10), and the remaining oxide silicon film 169 is removed by hydrofluoric acid, thereby obtaining the shape shown in FIG. 11I.

As shown in FIG. 11I, the p-type silicon wafer 151a is left in the shape of the support portion 121, and the cantilever 123 formed to extend from the support portion 121 (FIG. 10) in the right direction in FIG. 11A comprises the resistive layers 161 and the fourth resistive layer 171 formed on both the surfaces of the silicon nitride layer 163. The probe 125 is formed to be electrically connected to the distal end of the second resistive layer 157 (FIG. 11C) included in the resistive layers 161.

Finally, the electrode portions 129 (FIG. 11J) are formed on the upper surfaces of the proximal end portions of the first to third resistive layers 155,157, and 159, and on the fourth resistive layer 171 through the holes 165, respectively.

Since the cantilever 123 applied to the integrated AFM sensor of this embodiment manufactured as described above is constituted such that the resistive layers 161 consisting of the first to third resistive layers 155, 157, and 159 and the fourth resistive layer 171 are arranged on both the surfaces of the silicon nitride layer 163, the resistive layers can be easily patterned in one surface of the cantilever 123, thereby decreasing the width of the cantilever 123. This results in an increase in sensitivity of the integrated AFM sensor. More specifically, the spring modulus of a strip-shaped cantilever is in proportion to the width of the cantilever. Therefore, since the integrated AFM sensor of this embodiment having a width which is decreased by simplifying the resistive layers has a spring modulus which is decreased depending on the decrease in width of the integrated AFM sensor, it is understood that the integrated AFM sensor has a higher sensitivity for a weak force.

In addition, when the resistive layers (161, 171) are formed on both the surfaces of the silicon nitride layer 163, a leakage current between the resistive layers (161, 171) can be considerably decreased. As a result, a high sensitivity can be achieved.

The first and third resistive layers 155 and 159 serving as guard electrodes, for example, by applying earth potential to them, on both sides of the second resistive layer 157 connected to the probe 125 are formed on the cantilever 123 applied to this embodiment (FIG. 11C). As a result, for example, during STM measurement, when a signal of a force other than a force received by the cantilever 123 is detected by a circuit including the probe 125 and a target sample (not shown), an influence caused by disturbance noise is decreased, and measurement can be performed with high accuracy.

Figure 13:
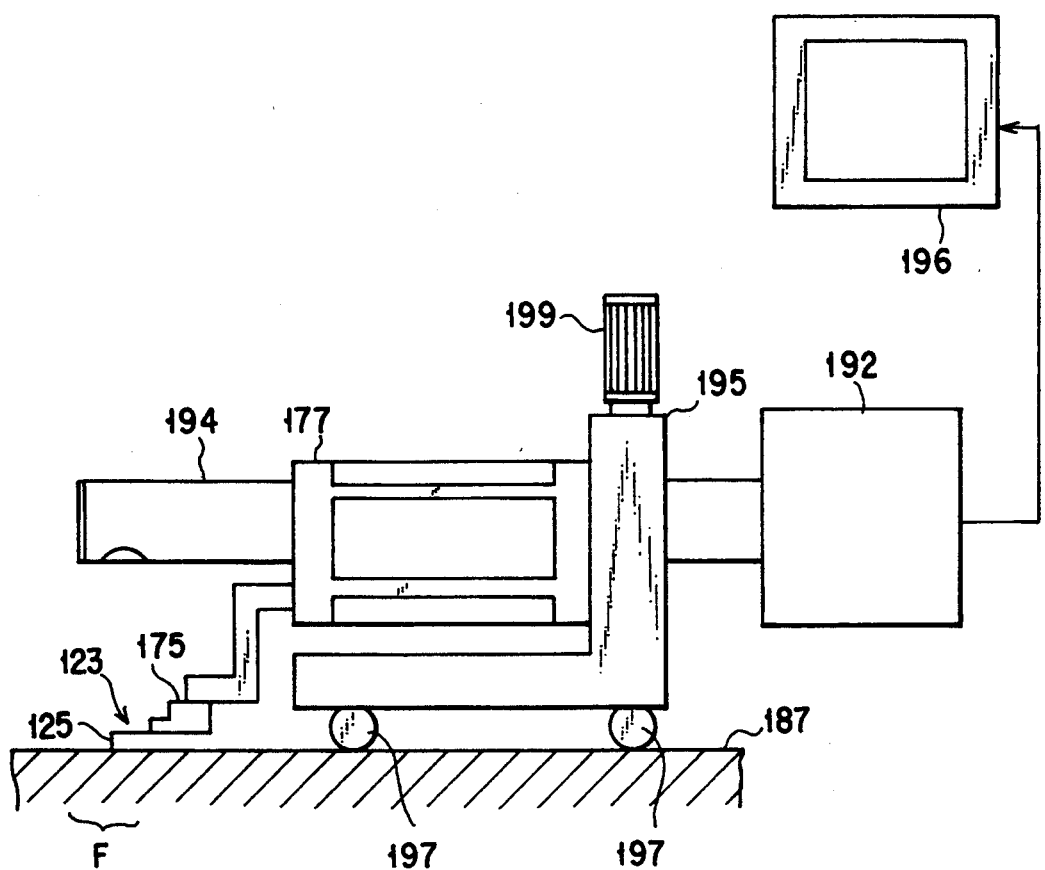
FIG. 13 shows an arrangement of a stand-alone AFM in which the AFM measurement system in FIG. 12 is incorporated.

An integrated AFM sensor according to the seventh embodiment of the present invention will be described below with reference to FIGS. 12 and 13. Since the arrangement of the integrated AFM sensor applied to this embodiment is the same as that of the sixth embodiment, the arrangement, operation, and effect of the seventh embodiment will be omitted.

As shown in FIG. 12, an integrated AFM sensor 175 of this embodiment is incorporated in an AFM measuring system 170, the proximal end of the AFM sensor 175 is fixed to the distal end portion of a holder 179 connected to a hollow cylindrical tube scanner 177, and the AFM sensor 175 is electrically connected to corresponding first and second signal detecting circuits 181 and 183 such that, in addition to an AFM signal, a plurality of signals can be detected. Note that the holder 179 is connected to the tube scanner 177 such that the longitudinal axis of the holder 179 is parallel to the axis of the tube scanner 177, and an integrated AFM sensor 175 fixed to the distal end portion of the holder 179 is arranged such that the axial direction (the axial direction of a cantilever 123) of the integrated AFM sensor 175 is parallel to the longitudinal direction of the holder 179. Therefore, the axis of the integrated AFM sensor 175 of this embodiment is defined to be parallel to the axis of the tube scanner 177. Although the arrangement of an apparatus for performing AFM measurement using the integrated AFM sensor of the present invention is already shown in FIG. 2, the apparatus in FIG. 12 is different from the apparatus in FIG. 2 in the above described points.

A signal detected or processed by the first and second signal detecting circuits 181 and 183 through the integrated AFM sensor 175 is output to a servo controller 185. The servo controller 185 has the following functions. A feedback signal obtained by performing predetermined arithmetic operations of a received signal is output to a scanner driver 189 such that a physical distance between a probe 125 of the integrated AFM sensor 175 and a target sample surface 187 is kept constant, and the feedback signal is output to a computer 191 such that changes in relative positions of the integrated AFM sensor 175 and the target sample surface 187 are formatted as a table on the basis of the received signal.

The scanner driver 189 causes the tube scanner 177 to slightly move by a predetermined amount on the basis of the received feedback signal through adjustment portions 193 formed on the outer surface of the tube scanner 177 at predetermined intervals, and can control the probe 125 of the integrated AFM sensor 175 in a direction S in FIG. 12 with respect to the target sample surface 187.

The AFM measuring system 170 arranged as described above, as shown in FIG. 13, is used to be fixed to a tube scanner fixing table 195. The tube scanner fixing table 195 is directly placed on the target sample surface 187 through three-point support balls 197. As a result, a stand-alone AFM is constituted.

Knob screws 199 connected to the three-point support balls 197 are arranged on the tube scanner fixing table 195. When the knob screws 199 are turned, the distance between the probe 125 and the target sample surface 187 can be controlled within a limit in which the distance can be adjusted.

In addition, a side-view mirror portion 194 in which a CCD camera 192 is incorporated is inserted in a cylindrical hole 177a (FIG. 12) axially extending through the tube scanner 177, and the side-view mirror portion 194 allows to optically observe a portion (F), to be measured by the integrated AFM sensor 175, of the target sample surface 187 through a display 196. Note that the tube scanner 177 is assembled independently of the side-view mirror portion 194, and the tube scanner 177 is arranged such that the tube scanner 177 does not directly receive vibration from the side-view mirror portion 194 in AFM measurement.

The integrated AFM sensor 175 of this embodiment incorporated in the AFM measuring system 170 constitutes an AFM whose long side vertically extends and whose axis is parallel to the axial direction of the tube scanner 177. For this reason, the inside of a pipe such as a glass pipe can be measured with high accuracy.

The eighth embodiment of the present invention will be described below with reference to FIGS. 14A and 14B. An integrated AFM sensor according to this embodiment, which has two piezoresistive layers similar to the fifth embodiment described above with reference to FIGS. 9A and 9B so as to be able to detect torsion of a cantilever as well as curvature, comprises a cantilever support portion 226 and a cantilever 228 whose proximal end portions are supported by the cantilever support portion 226.

The cantilever 228 includes two beam portions 230 extending from the cantilever support portion 226. The distal end portions of the two beam portions 230 are integrated with each other, and a triangular free end portion 232 is formed at the portion where the distal end portions are integrated with each other.

The cantilever 228 having the above appearance comprises a first silicon layer 206 constituting the beam portions 230 and the free end portion 232 and having a proximal end portion supported by the cantilever support portion 226, piezoresistive layers 212 formed near the upper surface layer of parts of the beam portions 230 on the upper surface of the first silicon layer 206, and electrodes, i.e., aluminum layers 222 stacked and formed on the upper surface of the proximal end portions of the beam portions 230 on which a passivation layer 218 is stacked.

Contact holes 220 for applying a voltage to the piezoresistive layers 212 through the aluminum layers 222 are formed in the passivation layer 218 near the proximal end portions of the beam portions 230, and the aluminum layers 222 and the piezoresistive layers 212 are electrically connected to each other through the contact holes 220.

Figure 14A:
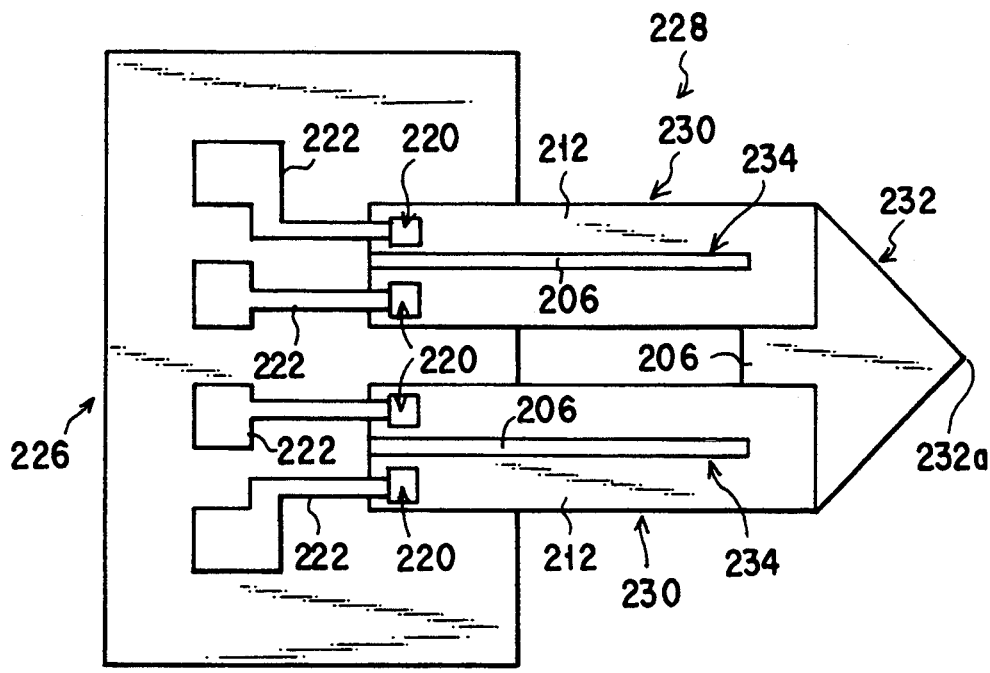
FIG. 14A is a plan view showing an integrated AFM sensor according to the eighth embodiment of the present invention.
Figure 14B:
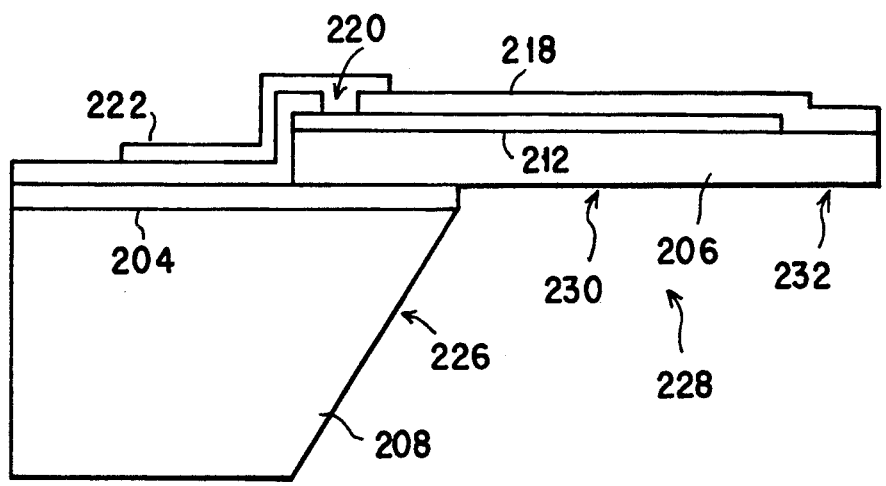
FIG. 14B is a sectional side view showing the integrated AFM sensor in FIG. 14A.

FIG. 14A is a plan view showing an arrangement of the cantilever 228 in detail. In FIG. 14A, for descriptive convenience, the passivation layer 218 is omitted.

As shown in FIG. 14A, in the cantilever 228 applied to this embodiment, the pair of contact holes 220 are formed in each of the two beam portions 230, and the aluminum layers 222 serving as electrodes for applying a voltage to the piezoresistive layers 212 are formed in the contact holes 220, respectively.

In addition, each of the piezoresistive layers 212 is stacked and formed on the upper surface of a corresponding one of the beam portions 230 to have a U shape such that a current supplied from the aluminum layers 222 to the piezoresistive layers 212 through one of the contact holes 220 returns to the other contact hole 220 through the free end portion 232 of the beam portions 230.

As described above, since longitudinal central portions 234 of the beam portions 230 and the free end portion 232 do not have the piezoresistive layers 212 to have small thicknesses, the cantilever 228 has not only a high "warpage sensitivity" but a high "torsion sensitivity" during AFM scanning. During the AFM scanning, the distal end portion 232a of the free end portion 232 serves as a probe.

A method of manufacturing the integrated AFM sensor will be described below with reference to FIGS. 15A to 15I.

In the integrated AFM sensor of this embodiment, a wafer 202, obtained by bonding silicon layers, which is one of SOI (Silicon On Insulator) wafers is used as a starting wafer.

Each of the plane directions of the first silicon layer 206 and a second silicon layer 208 respectively arranged on the upper and lower surfaces of a silicon oxide isolation layer 204 of the wafer 202 is (1,0,0), the first silicon layer 206 on the upper surface is an n-type silicon layer in which phosphorus (P) is doped, and the first silicon layer 206 has a thickness of 20 $\mu$m.

After the wafer 202 is washed, the first silicon layer 206 is dry-etched to have a thickness of 5 $\mu$m (FIG. 15A).

A spontaneous oxide layer formed on the surface of the wafer 202 is removed by hydrofluoric acid, and an $SiO_2$ layer 210 is deposited on the entire upper surface of the first silicon layer 206 to have a thickness of about 100 nm. Boron (B) is doped in the $SiO_2$ layer 210 from the upper direction by ion implantation, and a p-type piezoresistive layer 212 having a concentration of $10^{15}$ ions/cm$^2$ is formed on the upper surface of the first silicon layer 206 (FIG. 15B).

Figure 15D:
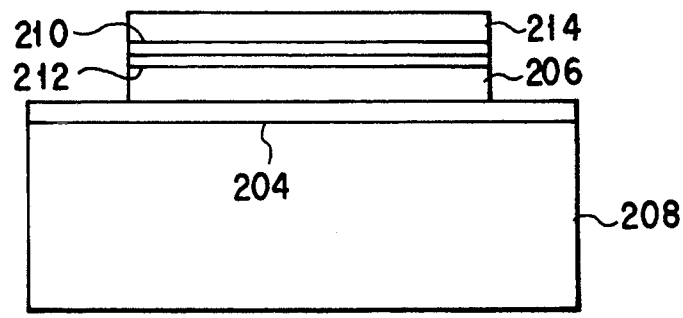

A thick-film resist 214 (FIG. 15D) is coated on the upper surface of the $SiO_2$ layer 210 to have a thickness of 10 $\mu$m, and the thick-film resist 214 is exposed and developed through a mask (not shown) having a pattern having a shape corresponding to the cantilever 228 (FIG. 14A), thereby patterning the resist 214 as shown in FIG. 15C.

The exposed portion is etched by anisotropic plasma dry etching up to the silicon oxide isolation layer 204 using ($SF_6 + C_2BrF_5$) and the patterned thick-film resist 214 (FIG. 15C) as a mask (FIG. 15D). Thereafter, the silicon oxide isolation layer 204 left on the upper surface of the $SiO_2$ layer 210 is removed (not shown).

Figure 15E:
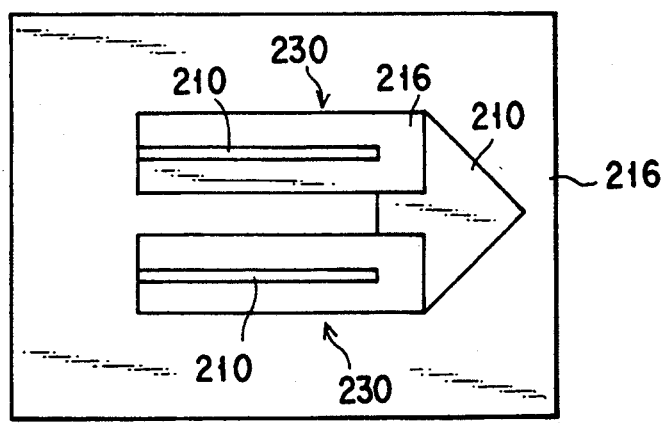
Figure 15F:
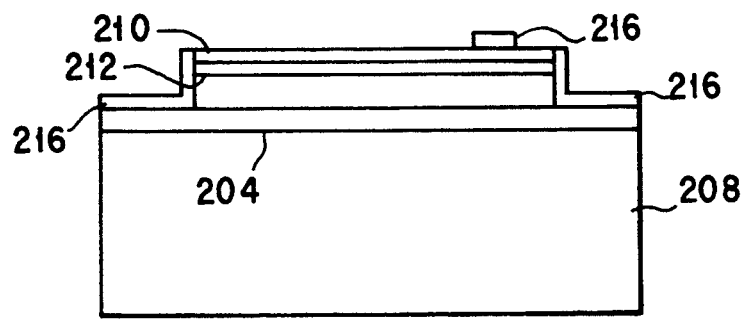

After a resist 216 is coated on the entire surfaces of the silicon oxide isolation layer 204 and the $SiO_2$ layer 210 (not shown), the resist 216 is exposed and developed through a mask (not shown) having a pattern having a shape corresponding to the pair of beam portions 230 (FIG. 14A), thereby patterning the resist 216 as shown in FIG. 15E.

The exposed portion (FIG. 15F), more specifically, the $SiO_2$ layer 210 is anisotropically etched from the upper direction using the patterned resist 216 as a mask to remove the $SiO_2$ layer 210 up to the piezoresistive layer 212.

As a result, a portion corresponding to the free end portion 232 (FIG. 14A) of the cantilever and portions corresponding to the longitudinal central portions 234 (FIG. 14A) of the beam portions 230 is formed to have a small thickness. For this reason, the spring modulus of the cantilever is decreased to increase its sensitivity. Thereafter, the resist 216 is removed (not shown).

Figure 15G:
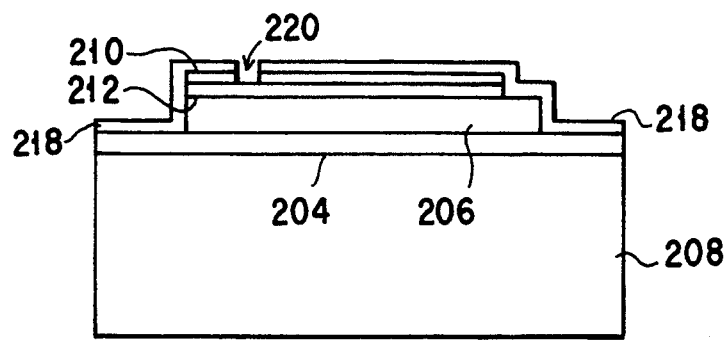
Figure 15H:
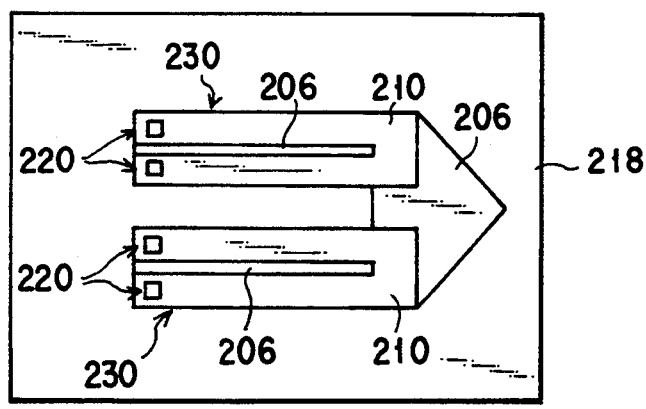

After the passivation layer 218 consisting of $SiO_2$ is deposited on the entire surfaces of the silicon oxide isolation layer 204 and the $SiO_2$ layer 210, the contact holes 220 are formed in the passivation layer 218 and the SiO2 layer 210 formed thereunder to apply a voltage to the piezoresistive layers 212 (FIG. 15G). The contact holes 220, as shown in FIG. 15H (a state wherein the passivation layer 218 is omitted for clearly describing the arrangement of the sensor is shown in FIG. 15H), are formed near the proximal end portions of the portions corresponding to the pair of beam portions 230 (FIG. 14A).

Figure 15I:
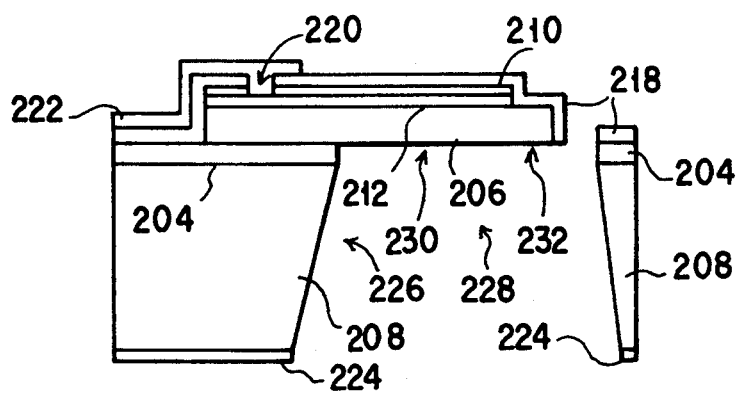

Finally, as shown in FIG. 15I, after the aluminum layers 222 are deposited on regions of the proximal end portions of the pair of beam portions 230 including the contact holes 220, the beam portions 230 on the side on which the aluminum layers 222 are deposited are protected by polyimide (not shown). In this state, the second silicon layer 208 is anisotropically etched up to the silicon oxide isolation layer 204 with EDP (Ethylene Diamine Pyrocatechol water) using a patterned SiO2 layer 224 under the second silicon layer 208 to remove the second silicon layer 208. After the silicon oxide isolation layer 204 is etched by buffered hydrofluoric acid, the polyimide is removed, thereby manufacturing the integrated AFM sensor of this embodiment.

FIG. 16 is a block diagram showing a displacement detecting circuit 256 applied to the integrated AFM sensor of this embodiment to detect the "warpage" and "torsion" of the cantilever 228. Note that only a necessary arrangement is shown in FIG. 16 for descriptive convenience.

As shown in FIG. 16, the integrated AFM sensor of this embodiment comprises, resistance change detecting circuits 236 and 238, having different systems, for detecting changes in the resistances of the piezoresistive layers 212 having different systems on the basis of changes in currents flowing in the piezoresistive layers 212 and a signal processing circuit 240 for arithmetically calculating signals output from the resistance change detecting circuits 236 and 238 to output a signal representing the "warpage" and "torsion" of the cantilever 228.

During AFM scanning, when "warpage" or "torsion" occurs in the resistance change detecting circuit 238 to change the resistances of the piezoresistive layers 212, and the currents flowing in the piezoresistive layers 212 are changed, the changes in currents are converted into signals corresponding to the changes in resistances of the piezoresistive layers 212, and are output to the signal processing circuit 240. The signal processing circuit 240 arithmetically calculates a sum of the received signals and outputs the value as a signal representing the "warpage" of the cantilever 228, or the signal processing circuit 240 arithmetically calculates a difference between the received signals and outputs the value as a signal representing the "torsion" of the cantilever 228.

As a means for detecting the changes in currents of the piezoresistive layers 212, a current-voltage converting circuit using an operational amplifier is used. In addition, other detecting means can be applied. For example, when a bridge circuit (not shown) is used, the resistance layer of the bridge can be arranged on the cantilever support portion 226.

When elements using piezoresistors are used as in the piezoresistive layers 212 of this embodiment, since signals output from the elements are changed due to a change in temperature, a temperature correcting mechanism (not shown) is preferably added to the signal processing circuit 240 etc. As a result, more stable AFM scanning can be performed with high accuracy.

As shown in FIG. 17, the integrated AFM sensor described above is generally incorporated in an AFM apparatus 242. More specifically, the cantilever support portion 226 is connected to a tube scanner 246 through a fixing jig 244 of the AFM apparatus 242.

During AFM scanning, the free end portion 232 of the cantilever 228 must be considerably close to the surface of a target sample 250 placed on a sample table 248. For this reason, the tube scanner 246 can scan the target sample 250 in X, Y and Z directions in response to a voltage applied through a scanner controller 254 controlled by a CPU 252 (FIG. 18). As a result, while the free end portion 232 of the cantilever 228 is brought considerably close to the surface of the target sample 250, the relationship between the relative positions of the free end portion 232 and the target sample 250 can be controlled with high accuracy.

As shown in FIG. 18, the integrated AFM sensor is set in the AFM apparatus 242 such that an axis 228a of the cantilever 228 is almost perpendicular to the X scanning direction having a high scanning frequency. As a result, while the free end portion 232 is brought considerably close to the surface of the target sample 250, the "warpage" and "torsion" of the cantilever 228 can be efficiently detected. However, when the direction of the axis 228a of the cantilever 228 coincides with the X scanning direction, some samples may receive a force which generates torsion. Therefore, the present invention is not limited to the direction of setting the integrated AFM sensor in the AFM apparatus.

As shown in FIG. 17, the displacement detecting circuit 256 is electrically connected to a terminal 258 extending from the fixing Jig 244, and the terminal 258 is electrically connected to electrodes, i.e., the aluminum layers 222 by contact wires. For this reason, a current supplied from the displacement detecting circuit 256 to the terminal 258 is supplied to the piezoresistive layers 212 through the contact wires and the aluminum layers 222. As a result, a predetermined voltage is applied to the piezoresistive layers 212.

When AFM scanning is performed, and the cantilever 228 is displaced according to the surface shape of the target sample 250 to generate distortion, since the resistances of the piezoresistive layers 212 are changed, currents flowing in the piezoresistive layers 212 are changed. The changes in currents at this time are detected by the displacement detecting circuit 256, and signals representing "warpage" and "torsion" of the cantilever 228 are output.

The signal output from the displacement detecting circuit 256 is input to the CPU 252, and the signal is subjected to image processing to be displayed on a monitor. The signal is used as an original signal used when digital feedback control is performed through the CPU 252 such that the free end portion 232 of the cantilever 228 and the target sample 250 are kept to be considerably close to each other.

Note that the displacement detecting circuit 256 and the scanner controller 254 are electrically connected to each other to properly select analog feedback control, and a signal is output from the displacement detecting circuit 256 to the scanner controller 254.

The CPU 252 transmits a signal to the pair of beam portions 230 constituting the cantilever 228 on the basis of the signal output from the displacement detecting circuit 256 to control the coarseness of the sample table 248.

As described above, in the integrated AFM sensor of this embodiment, since each of the pair of beam portions 230 constituting the cantilever 228 includes the piezoresistive layers 212 having a plurality of systems, changes in resistances of the piezoresistive layers 212 caused by the "warpage" and "torsion" of the cantilever 228 can be independently detected. As a result, since forces which cause the "warpage" and "torsion" of the cantilever 228 and act between the target sample 250 and the end portion 232a of the free end portion 232 serving as a probe can be detected with high accuracy, the surface shape of the target sample 250 can be measured at a high resolving power.

Figure 19:
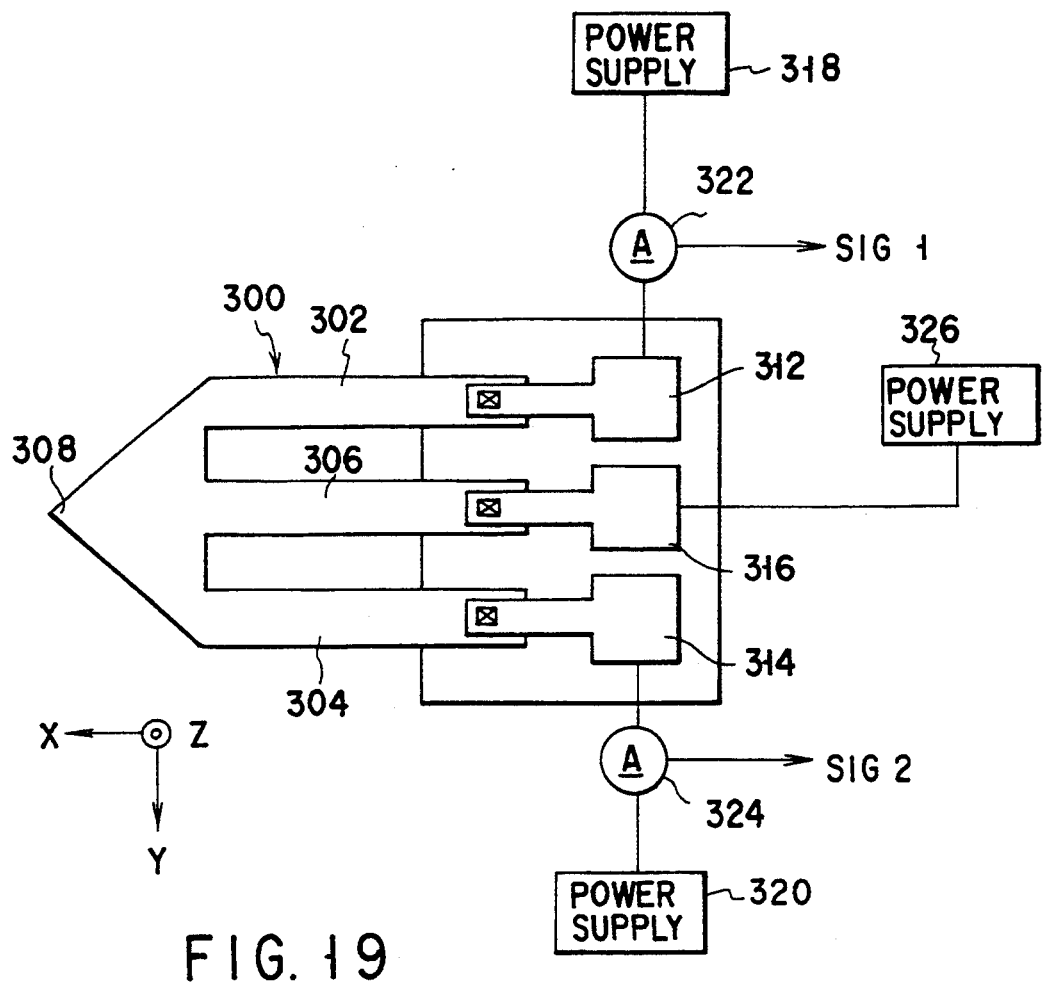
FIG. 19 shows an integrated SPM sensor and a displacement measuring circuit according to a ninth embodiment of the present invention.

FIG. 19 shows an integrated SPM sensor and its displacement measuring circuit according to the ninth embodiment of the present invention. The integrated SPM sensor of the ninth embodiment includes an E-shaped cantilever 300 on which a piezoresistive layer, having three strips 302, 304 and 306, is formed. End portions of the strips 302, 304 and 306 are provided with terminals 312, 314 and 316, respectively. A power supply 318 is connected to the terminal 312 via a current detecting circuit 322, a power supply 320 is connected to the terminal 314 via a current detecting circuit 324, and a power supply 326 is connected to the terminal 316. The three strips 302, 304 and 306 are electrically coupled to each other at the distal end portion of the cantilever 300.

When the resistances of the strips 302, 304 and 306 vary in accordance with distortion such as warping and torsion of the cantilever 300, variations occur in currents flowing through the piezoresistive layer. By detecting variations in the currents by means of the current detecting circuits 322 and 324, the amount of distortion of the cantilever can be detected. Variations in outputs of the current detecting circuits 322 and 324 are regarded as indicating the amount of Z-directional warp.

An explanation is now made for the case where the cantilever 300 warps in the Z-direction, without twisting in a Y-direction. In this case, the distortion amounts of the strips 302 and 304, located on both sides of the cantilever with respect to its longitudinal axis, are equal to each other. Accordingly, the levels of signals 1 and 2, which are output respectively from the current detecting circuits 322 and 324, vary in the same manner.

In the case where the cantilever twists in the Y-direction such that a difference occurs between the distortion amounts of the strips 302 and 304 located on both sides of the cantilever with respect to its longitudinal axis, a difference accordingly occurs between the amount of variation in the level of signal 1 and the amount of variation in the level of signal 2. A difference between signals 1 and 2, corresponding to the torsion of the cantilever 300, is regarded as what is called an LFM signal.

Figure 20:
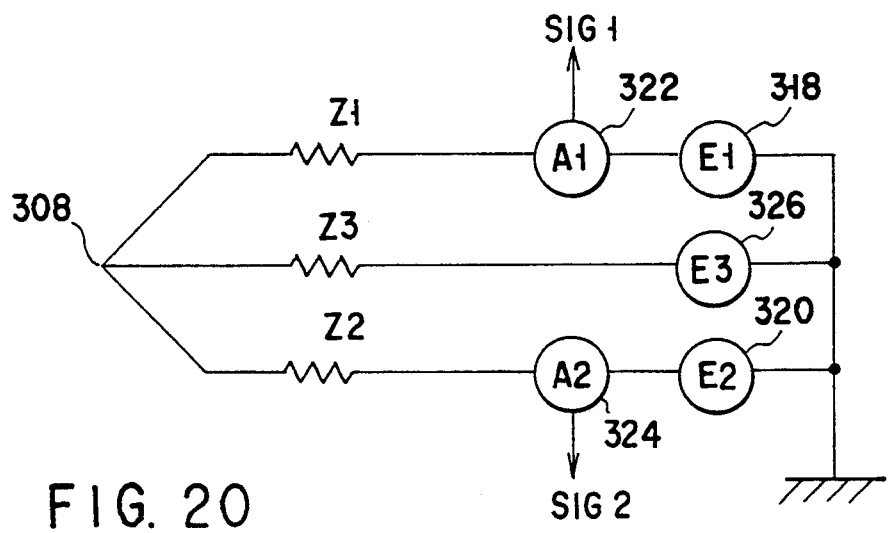
FIG. 20 is a diagram showing an equivalent circuit of the embodiment of FIG. 19.

FIG. 20 shows an equivalent circuit of the embodiment shown in FIG. 19. In this equivalent circuit, the strips 302, 304 and 306 of the piezoresistive layer are represented by resistances (impedances) Z1, Z2 and Z3, respectively.

The operation of the equivalent circuit of FIG. 20 will now be explained. Suppose that voltages at the power supplies 318 and 320 are maintained at −3 volts, a voltage at the power supply 326 is maintained at +3 volts, and the resistances Z1, Z2 and Z3 are 4 kΩ (Z1=Z2=Z3=4 kΩ), for example. Currents which flow through Z1 and Z2 under the above conditions are 0.5 mA, following Kirchhoff's law. The current detecting circuits 322 and 324 detect the above currents, and output signals 1 and 2, respectively.

When the cantilever 300 warps without twisting, the resistances Z1, Z2 and Z3 change to 4 kΩ+r, and the currents flowing through Z1 and Z3 also change to 0.5 mA+i, where r and i correspond respectively to a variation of resistance and a variation of current which occur in accordance with distortion of the cantilever. Therefore, by detecting the variation of the current, the amount of warping of the cantilever can be detected. In this case, there is no difference in level between signals 1 and 2.

When the cantilever twists in the Y-direction such that a difference occurs between the distortion amounts of the strips 302 and 304 located on both sides of the cantilever with respect to its longitudinal axis, a difference occurs between variations in Z1 and Z3. This results in a difference occurring in the levels of signals 1 and 2; that is, (signal 1)−(signal 2)≠0. Therefore, by calculating a difference between the levels of signals 1 and 2, the amount of torsion of the cantilever can be detected.

A signal representing a difference, (signal 1)−(signal 2), corresponds only to torsion of the cantilever. When warping and torsion of the cantilever occur simultaneously, a signal corresponding to warp can be obtained by subtracting a•{(signal 1)−(signal 2)}, where a is a constant, from a signal representing the sum, {(signal 1)+(signal 2)}. Normally, a•{(signal 1)−(signal 2)} is regarded as an AFM signal, and is used in a servo control for maintaining, at a constant value, the pressure at which a probe is in contact with a surface of the sample to be measured. Needless to say, the sum of signals 1 and 2, that is, {(signal 1)+(signal 2)}, is used in a servo control in some cases; for example, when it is preferred that the response frequency of a servo control circuit not be degraded due to arithmetic operations.

In the above-described equivalent circuit of FIG. 20, a secondary advantage can be expected, since the resistances Z1, Z2 and Z3 are equal to each other, and each of the potentials of the power supplies 318 and 320 is opposite in polarity to, and identical in absolute value to, the potential of the power supply 326. A potential at the point where the resistances Z1, Z2 and Z3 meet, that is, a potential in the vicinity of the probe of the integrated SPM sensor, is 0 volts in the state of no distortion of the cantilever. By controlling to 0 volts a surface potential of the sample to be measured, a potential difference of 0 volts can be attained between the probe and the sample surface. As a result, electrostatic attraction can be prevented from occurring between the probe and the sample surface, making it possible to detect a very small amount of power by the use of the integrated SPM sensor.

In the above-described embodiment, the resistances Z1, Z2 and Z3 are equal to each other. However, this condition is not essential, and a relation Z1=Z2>Z3 or a relation Z1=Z2<Z3 can be adopted. For example, in order to increase sensitivity to torsion of the cantilever, it is preferable that the outer strips of the E-shaped cantilever be made narrow, so as to allow the cantilever to twist easily. As a result of the outer strips being made narrow, their resistances Z1 and Z2 become larger than Z3. In this case, the potential in the vicinity of the probe is not 0 volts. Therefore, when a potential difference between the probe and the sample surface is desired to be 0 volts, it is necessary to accordingly adjust the power supplies 318, 320 and 326.

The power supplies 318, 320 and 326 are DC power supplies. However, they may be AC power supplies.

A structure for detecting torsion of the cantilever, which is explained in this embodiment, is applicable not only to the E-shaped integrated SPM sensor, but also to other SPM sensors or different shape. The above structure is applicable also to an integrated SPM sensor having two U-shaped piezoresistive layers as shown in FIG. 14A, for example. In this case, the inner two of four terminals 222 shown in FIG. 14A are short-circuited so as to provide an integrated SPM sensor having substantially three terminals. This SPM sensor can detect distortion of the cantilever as does the E-shaped integrated SPM sensor of this embodiment. Needless to say, an integrated SPM sensor in which the outer two of four terminals 222 shown in FIG. 14A are short-circuited, can also detect distortion of the cantilever including torsion. However, the detection sensitivity of the integrated SPM sensor, in which the inner two terminals are short-circuited, is higher than that in which the outer two terminals are short-circuited, and is therefore preferred.

Figure 21:
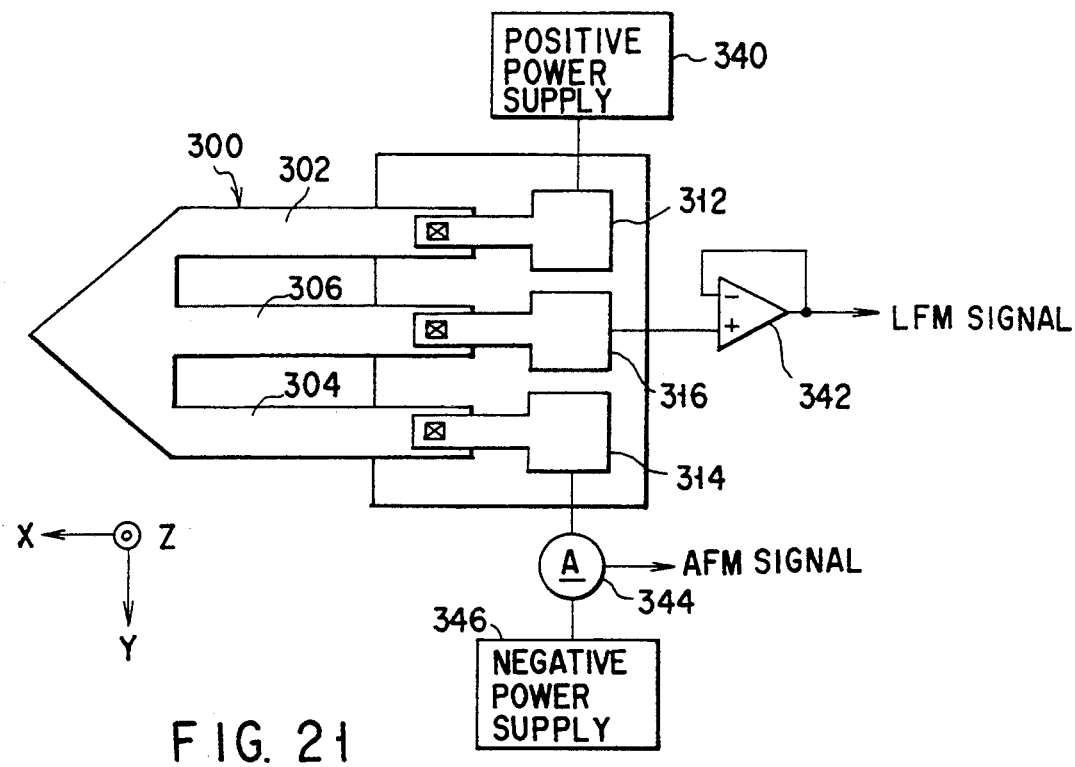
FIG. 21 shows the structure of an integrated SPM sensor according to a tenth embodiment of the present invention.

FIG. 21 shows a structure of an integrated SPM sensor according to the tenth embodiment of the present invention. The integrated SPM sensor of this embodiment is of the same type as that shown in FIG. 19.

Referring to FIG. 21, a positive power supply 340 is connected to the terminal 312, a negative power supply 346 is connected to the terminal 314 via an ammeter 344, and a voltage detecting circuit 342 is connected to the terminal 316.

Predetermined potentials are applied to the terminals 312 and 314 by the positive power supply 340 and the negative power supply 346, respectively; for example, +3 volts and −3 volts are respectively applied to the terminals 312 and 314 such that the distal end of the cantilever 300 is at 0 volts potential.

When Z-directional displacement of the cantilever 300 occurs, the resistances of the strips 302 and 304 vary, while the distal end of the cantilever 300 is at 0 volts potential. In accordance with this variation, the values of currents flowing through the strips 302 and 304 vary. The ammeter (current detector) 344 detects the current value, and outputs it as an AFM signal corresponding to the Z-directional displacement of the cantilever 300.

When displacement of the cantilever 300 occurs due to twisting thereof, the potential at the distal end changes from 0 volts, since variations in the resistances of the strips 302 and 304 differ from each other. Accordingly, the potential of the terminal 316 will vary. The voltage detecting circuit 342 detects a variation in the potential at the terminal 316, and outputs an LFM signal corresponding to the torsion of the cantilever 300.

The AFM signal and the LFM signal are supplied to a computer, and are processed so as to obtain an AFM image and an LFM image. The AFM signal contains a component representing displacement due to torsion. Therefore, a more accurate AFM image can be obtained using the LFM signal as a correction signal at the time the AFM image is formed.

Figure 22:
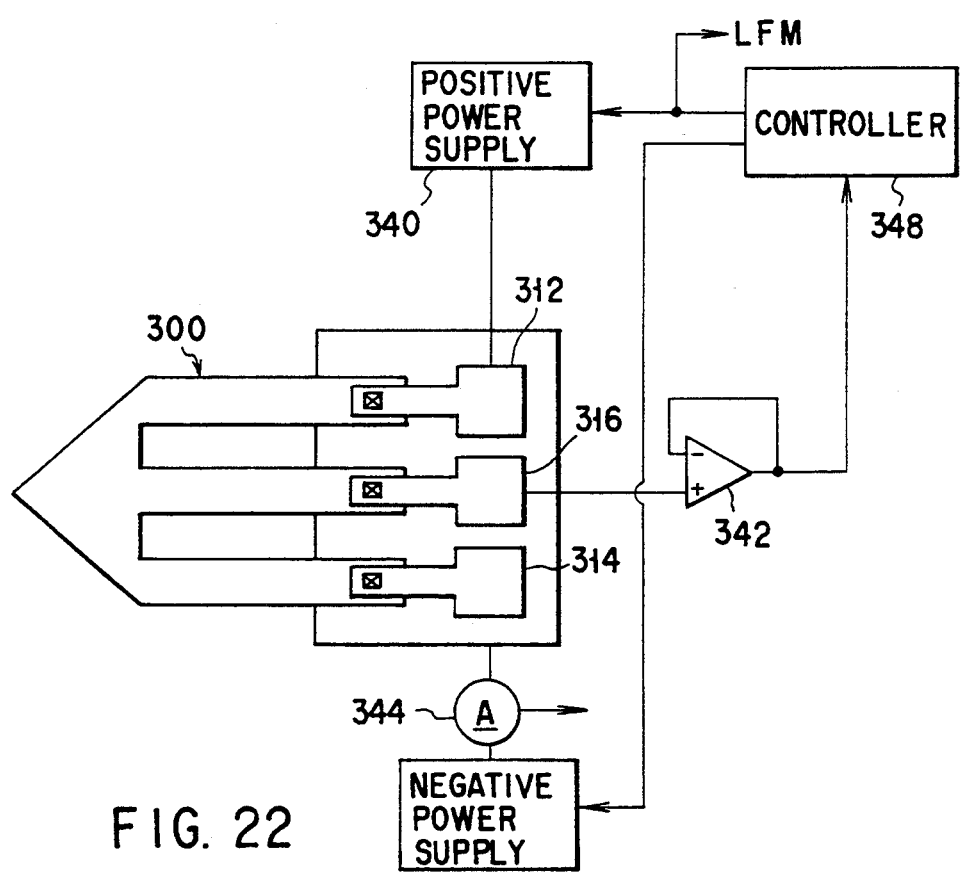
FIG. 22 shows the structure of an integrated SPM sensor according to an eleventh embodiment of the present invention.

FIG. 22 shows a structure of an integrated SPM sensor according to the eleventh embodiment of the present invention. In addition to the structural elements of the tenth embodiment (FIG. 21), the integrated SPM sensor of the eleventh embodiment (FIG. 22) includes a controller 348 for controlling the power supply 340 and the power supply 346 in accordance with an output from the voltage detecting circuit 342.

Voltages are applied to the terminals 312 and 314 such that the distal end of the cantilever 300 is at 0 voltage potential. When the cantilever 300 twists, the potential at the distal end changes from 0 volts. The controller 348 receives an output of the voltage detecting circuit 342, detects the potential at the distal end on the basis of the output, and controls the power supply 340 and the power supply 346 such that the potential at the distal end of the cantilever is maintained at 0 volts, while maintaining a potential difference between the terminals 312 and 314 at a constant value.

Thus, according to the embodiment of FIG. 22, the potential at the distal end of the cantilever 300 is maintained at 0 volts. When the sample is at 0 volts, electrostatic attraction does not occur between the probe and the sample, making it possible to perform a high-resolution AFM measurement.

Figure 23:
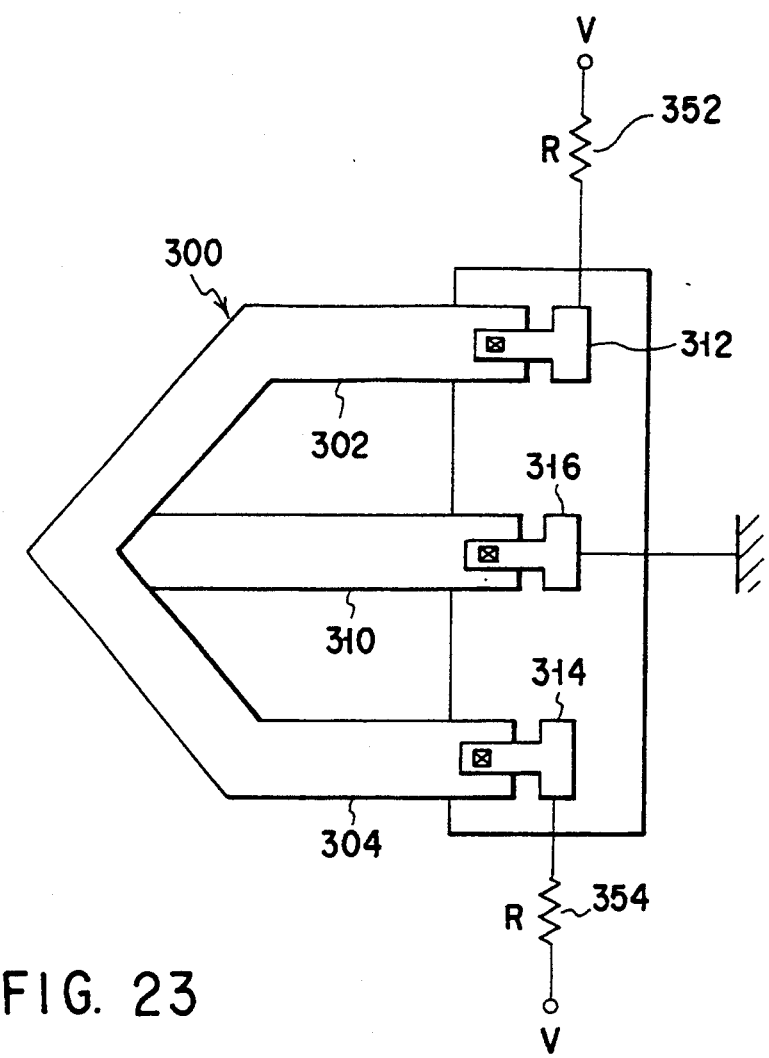
FIG. 23 shows the structure of an integrated SPM sensor according to a twelfth embodiment of the present invention.

FIG. 23 shows a structure of an integrated SPM sensor according to the twelfth embodiment of the present invention. In this embodiment, the strips 302 and 304 located on both sides of the cantilever 300 meet at the distal end portion of the cantilever, and are formed of a substantially U-shaped piezoresistive layer. The center strip 310 is formed of a film made of a low resistance material, that is, a conductive layer. End portions of the strips 302, 304 and 310 of the cantilever 300 are provided with the terminals 312, 314 and 316, respectively. Resistances 352 and 354 of the same value R are connected to the terminals 312 and 314, respectively, and a constant voltage V is applied through the resistances 352 and 354. The terminal 316 is grounded.

The terminal 316 is constantly kept at 0 volts, since it is grounded. Suppose that the strip 302, that is, a portion of the piezoresistive layer which extends from the distal end of the cantilever to the terminal 312, has resistance R2, and the strip 304, that is, a portion of the piezoresistive layer which extends from the distal end to the terminal 314, has resistance R1. In this case, the potential V2 of the terminal 312 and the potential V1 of the terminal 314 are given as:

$$V1 = R1 \cdot V/(R+R1)$$

$$V2 = R2 \cdot V/(R+R2)$$

As may be understood from the above formulas, the potentials of the terminals 312 and 314 vary in accordance with variations in the resistances R2 and R1, respectively. Therefore, by detecting the potentials of the terminals 312 and 314, information on torsion of the cantilever 300 can be obtained.

Figure 24:
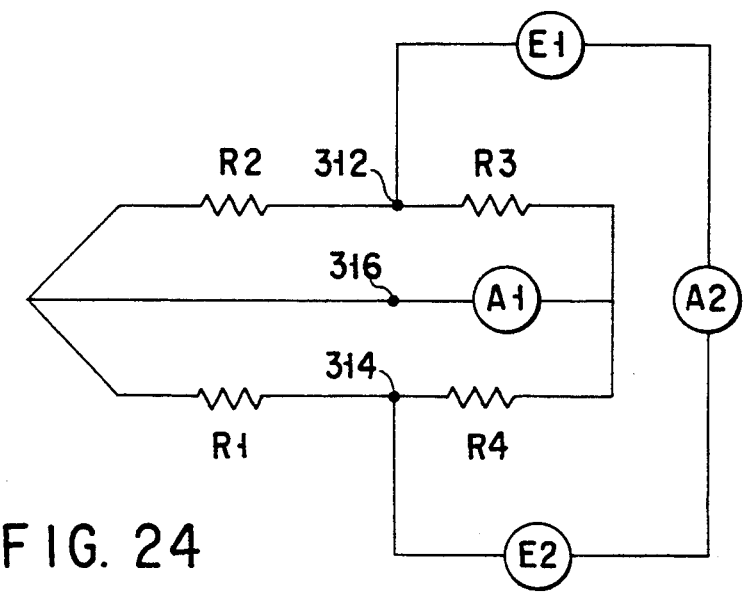
FIG. 24 shows an equivalent circuit of an integrated SPM sensor according to a thirteenth embodiment of the present invention.

Another detecting system applicable to the E-shaped integrated SPM sensor shown in FIG. 19 or FIG. 23, will now be explained as the thirteenth embodiment. The detecting system of this embodiment employs a bridge circuit. An equivalent circuit when the detecting system is applied to the integrated SPM sensor of FIG. 23, is shown in FIG. 24. Through use of the bridge circuit which is well known as a means for measuring an impedance, a variation in impedance can be measured irrespective of a fluctuation of a power supply which is incorporated in a circuit in order to detect a current.

In FIG. 24, R1 and R2 are the resistances of the strip 304 and of the strip 302, respectively. R3 and R4 represent fixed resistances. In normal conditions, R1 and R2 are equal to each other, and R3 and R4 are also equal to each other. One end of the resistance R3 is coupled to the terminal 312, while one end of the resistance R4 is coupled to the terminal 314. The other end of the resistance R3 and that of the resistance R4 are coupled to each other. An ammeter A1 is provided between the terminal 316 and the point at which the resistances 3 and 4 are connected to each other. A power supply E1 and a power supply E2 are connected to the terminals 312 and 314, respectively, and an ammeter A2 is coupled between power supplies E1 and E2.

As may be understood from FIG. 24, the detecting circuit of this embodiment comprises a bridge circuit in combination with the resistances R1, R2 of the cantilever. While a relationship, R1−R3=R2−R4, is being satisfied, a current does not flow through the ammeter A1. When R1 and R2 become unequal to each other upon torsion of the cantilever, a current flows through the ammeter A1. In the case where the cantilever warps without twisting, variations in R1 and R2 are equal to each other, and therefore the relationship, R1−R3=R2−R4, is satisfied, with the result that no current flows through the ammeter A1. A value indicated by the ammeter A1 corresponds to torsion of the cantilever, and can be regarded as a signal representing torsion, that is, an LFM signal.

On the other hand, a value indicated by the ammeter A2 varies even when the cantilever warps without twisting. Supposing that R1 and R2 change to R1' and R2' upon warping of the cantilever, a combined resistance or R total of four resistances, viewed from the ammeter A2, is expressed as:

$$R\ total = (R1' \cdot R4)/(R1' + R4) + (R2' \cdot R3)/(R2' + R3)$$

Since a potential difference is provided by two constant power supplies E1 and E2, the ammeter A2 can detect a variation of current according to distortion of the cantilever. A value obtained by subtracting the value indicated by the ammeter A1 from the value indicated by the ammeter A2, corresponds to a signal from which a signal component representing torsion of the cantilever has been removed; that is, a signal representing warping of the cantilever.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An integrated SPM sensor comprising:
    an elastically deformable cantilever having a free end portion;
    first detecting means for detecting displacement of a right side portion of said cantilever, with respect to a central longitudinal axis of said cantilever, and for producing a first detection signal which is a function of a detected displacement of said right side portion; and
    second detecting means for detecting displacement of a left side portion of said cantilever, with respect to said central longitudinal axis of said cantilever, and for producing a second detection signal which is a function of a detected displacement of said left side portion; and
    whereby torsion of said cantilever is detected on the basis of said detection signals obtained from said first and second detecting means.

2. A sensor according to claim 1, further comprising:
    a support portion supporting said cantilever;
    said first and second detecting means including substantially U-shaped piezoresistive layers respectively arranged on said cantilever, each of said piezoresistive layers including end portions arranged on said support portion and a curved portion positioned near said free end portion of said cantilever, and each piezoresistive layer having a resistance which changes in accordance with deformation of a part of said cantilever on which the respective piezoelectric layer is mounted; and
    electrodes electrically connected to said end portions of said piezoelectric layers.

3. A sensor according to claim 2, wherein said piezoresistive layers are separated from each other.

4. A sensor according to claim 3, wherein said support portion is made of glass.

5. A sensor according to claim 2, wherein said U-shaped layers are in contact with each other to form a substantially E-shaped layer which has three ends, such that said electrodes comprise a center electrode and two outer side electrodes.

6. A sensor according to claim 2, further comprising a probe made of a conductive material, said probe having a sharp tip, and being arranged at said free end portion of said cantilever.

7. A sensor according to claim 6, wherein said support portion is made of glass.

8. A sensor according to claim 6, further comprising a strip-like conductive layer extending on said cantilever from said support portion, and said strip-like conductive layer being electrically connected to said probe.

9. A sensor according to claim 8, wherein said piezoresistive layers are arranged on a surface of said cantilever which is opposite to a surface of said cantilever on which said conductive layer is provided.

10. A sensor according to claim 8, wherein:
    said piezoresistive layers and said conductive layer are mounted on a surface of said cantilever;
    said conductive layer extends along said central longitudinal axis of said cantilever; and
    said piezoelectric layers are respectively arranged along both opposite sides of said conductive layer so as to guard said conductive layer against electrical noise.

11. A sensor according to claim 5, wherein said first and second detecting means comprise first and second electric current detecting means, respectively, which are electrically connected to the outer side electrodes, for detecting a electric currents flowing therethrough.

12. A sensor according to claim 11, wherein said first and second detecting means comprise:
    means for applying predetermined electric potentials to the outer side and center electrodes; and
    means for detecting electric currents flowing through the outer side electrodes.

13. An integrated SPM sensor comprising:
    an elastically deformable cantilever having a free end portion and a proximal end portion;
    a support portion for supporting said proximal end portion of said cantilever;

a conductive probe formed on said free end portion of said cantilever;

a strip-like conductive layer electrically connected to said probe and extending on said cantilever from said free end portion of said cantilever to said proximal end portion thereof, and along a central longitudinal axis thereof; and guard electrodes extending along respective opposite sides of said conductive layer, for guarding said conductive layer against electrical noise.

14. An integrated SPM sensor comprising:

a support member;

an elastically deformable cantilever having a fixed end supported by said support member, said cantilever further having a free end and two sides, said cantilever including two side strips of piezoresistor which extend along both sides of said cantilever end which are electrically connected to each other at the free end of said cantilever, and said cantilever further including a center strip which extends on a central portion of said cantilever in parallel to the sides and said center strip being electrically connected to said two piezoresistive strips at the free end of said cantilever; and outer and center electrodes connected to said side and center strips at the fixed end of said cantilever, respectively.

15. A sensor according to claim 14, wherein said piezoresistive strips are made of a single layer.

16. A sensor according to claim 15, wherein said center strip is made of piezoresistor and is also made of said single layer.

17. A sensor according to claim 15, wherein said center strip is made of a low resistance material.

18. A sensor according to claim 14, further comprising:

means for applying predetermined electric potentials to said outer and center electrodes; and means for detecting electric currents flowing through said outer electrodes.

19. A sensor according to claim 18, wherein said center electrode is grounded.

20. A sensor according to claim 14, further comprising:

means for applying, to said outer electrodes, predetermined electric potentials which are identical in absolute value to and opposite in polarity to each other;

means for detecting the electric potential at said center electrode; and means for detecting electric current flowing through said outer electrodes.

21. A sensor according to claim 14, further comprising:

means for applying, to said outer electrodes, predetermined electric potentials which are identical in absolute value to and opposite in polarity to each other;

means for detecting an electric current flowing through said center electrode; and means for detecting an electric current flowing through said outer electrodes.

* * * * *

UNITED STATES PATENT AND TRADEMARK OFFICE
CERTIFICATE OF CORRECTION

PATENT NO. : 5,386,720
DATED : February 7, 1995
INVENTOR(S) : Akitoshi TODA et al It is certified that error appears in the above-indentified patent and that said Letters Patent is hereby corrected as shown below:

In the title page, under Section [75] INVENTORS,

Before "TAKAYAMA", insert --Akitoshi Toda, Tokyo, Michio--

Signed and Sealed this

Sixteenth Day of January, 1996

Attest:

BRUCE LEHMAN

Attesting Officer

Commissioner of Patents and Trademarks